(12) United States Patent
Sasaki et al.

(10) Patent No.: US 10,177,413 B2
(45) Date of Patent: Jan. 8, 2019

(54) LITHIUM ION SECONDARY BATTERY

(71) Applicant: NEC Corporation, Tokyo (JP)

(72) Inventors: Hideaki Sasaki, Tokyo (JP); Takehiro Noguchi, Tokyo (JP); Yuukou Katou, Tokyo (JP); Makiko Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/443,719

(22) PCT Filed: Nov. 18, 2013

(86) PCT No.: PCT/JP2013/081086
§ 371 (c)(1),
(2) Date: May 19, 2015

(87) PCT Pub. No.: WO2014/080871
PCT Pub. Date: May 30, 2014

(65) Prior Publication Data
US 2015/0303521 A1    Oct. 22, 2015

(30) Foreign Application Priority Data

Nov. 20, 2012 (JP) ................................. 2012-254758
Mar. 15, 2013 (JP) ................................. 2013-054387

(51) Int. Cl.
*H01M 10/052* (2010.01)
*H01M 10/0569* (2010.01)
(Continued)

(52) U.S. Cl.
CPC ....... *H01M 10/0569* (2013.01); *H01M 4/131* (2013.01); *H01M 4/505* (2013.01);
(Continued)

(58) Field of Classification Search
None
See application file for complete search history.

(56) References Cited

U.S. PATENT DOCUMENTS

2006/0078801 A1* 4/2006 Yamaguchi ........... H01M 4/364
429/326
2007/0224504 A1    9/2007 Kita et al.
(Continued)

FOREIGN PATENT DOCUMENTS

CN    101030661 A    9/2007
CN    101188282 A    5/2008
(Continued)

OTHER PUBLICATIONS

CN 10-1640264 (Fenggang)—Method for manufacturing negative pole piece of lithium-ion battery & lithium-ion battery using negative pole piece.*
(Continued)

*Primary Examiner* — Sarah A. Slifka
*Assistant Examiner* — Haroon S. Sheikh
(74) *Attorney, Agent, or Firm* — Finnegan, Henderson, Farabow, Garrett & Dunner, L.L.P.

(57) ABSTRACT

The present invention is a lithium ion secondary battery comprising a positive electrode and a non-aqueous electrolyte solution comprising a non-aqueous electrolyte solvent, wherein the positive electrode comprises a positive electrode active material having an operating potential at 4.5 V or higher versus lithium metal, the non-aqueous electrolyte solvent comprises a fluorinated phosphate ester represented by a predetermined formula and at least one selected from the group consisting of sulfone compounds represented by predetermined formulae, and the sulfone compound is included in an amount of 5 volume % or more in the non-aqueous electrolyte solvent.

12 Claims, 1 Drawing Sheet

(51) Int. Cl.
*H01M 4/505* (2010.01)
*H01M 4/525* (2010.01)
*H01M 10/0567* (2010.01)
*H01M 4/131* (2010.01)
*H01M 10/0525* (2010.01)
*H01M 4/62* (2006.01)

(52) U.S. Cl.
CPC .......... *H01M 4/525* (2013.01); *H01M 4/622* (2013.01); *H01M 10/052* (2013.01); *H01M 10/0525* (2013.01); *H01M 10/0567* (2013.01); *H01M 2300/0034* (2013.01); *H01M 2300/0042* (2013.01); *Y02T 10/7011* (2013.01)

(56) References Cited

U.S. PATENT DOCUMENTS

| | | | |
|---|---|---|---|
| 2007/0224516 A1* | 9/2007 | Deguchi | H01M 2/16 429/339 |
| 2008/0286652 A1 | 11/2008 | Nazri et al. | |
| 2009/0130551 A1 | 5/2009 | Mori et al. | |
| 2010/0015451 A1* | 1/2010 | Suzuta | B32B 15/08 428/424.8 |
| 2010/0092869 A1* | 4/2010 | Kaneko | H01M 4/362 429/303 |
| 2010/0092872 A1 | 4/2010 | Abe et al. | |
| 2012/0009485 A1* | 1/2012 | Xu | H01G 11/58 429/336 |
| 2012/0028137 A1 | 2/2012 | Chase et al. | |
| 2012/0288753 A1 | 11/2012 | Wietelmann | |
| 2014/0248529 A1 | 9/2014 | Chen et al. | |

FOREIGN PATENT DOCUMENTS

| | | |
|---|---|---|
| CN | 101394007 A | 3/2009 |
| CN | 101640264 A * | 2/2010 |
| CN | 102136604 A | 7/2011 |
| CN | 102306833 A | 1/2012 |
| CN | 102318109 A | 1/2012 |
| CN | 103931040 A | 7/2014 |
| EP | 2 779 297 A1 | 9/2014 |
| JP | 7-249432 | 9/1995 |
| JP | 10-116627 | 5/1998 |
| JP | 2000-77098 | 3/2000 |
| JP | 2002-033117 | 1/2002 |
| JP | 3304187 | 7/2002 |
| JP | 2003-100342 | 4/2003 |
| JP | 2003-168480 | 6/2003 |
| JP | 2004-087136 | 3/2004 |
| JP | 3821495 | 9/2006 |
| JP | 3878206 | 2/2007 |
| JP | 2007-287677 | 11/2007 |
| JP | 2009-211822 | 9/2009 |
| JP | 4416991 | 2/2010 |
| JP | 2010129449 | 6/2010 |
| JP | 2010-238510 | 10/2010 |
| JP | 2011-187163 | 9/2011 |
| JP | 2012-094454 | 5/2012 |
| JP | 4972915 | 7/2012 |
| JP | 2013-30284 | 2/2013 |
| JP | 2013-093321 | 5/2013 |
| WO | WO 2006/016733 A1 | 2/2006 |
| WO | WO 2008/133112 A1 | 11/2008 |
| WO | WO 2010/090028 | 8/2010 |
| WO | WO 2011/162169 A1 | 12/2011 |
| WO | WO 2012/005945 | 1/2012 |
| WO | WO 2012/077712 A1 | 6/2012 |
| WO | WO 2012/127717 | 9/2012 |
| WO | WO 2012/132976 | 10/2012 |
| WO | WO 2012/133902 A1 | 10/2012 |
| WO | WO 2012/141301 | 10/2012 |
| WO | WO 2013/069474 A1 | 5/2013 |
| WO | WO 2013/073288 | 5/2013 |
| WO | WO 2013/129428 A1 | 9/2013 |
| WO | WO 2013/183655 A1 | 12/2013 |

OTHER PUBLICATIONS

A. Cresce et al., "Electrolyte Additive in Support of 5 V Li Ion Chemistry", Journal of the Electrochemical Society, Electrochemical Society; The Institution of Electrical Engineers, Stevenage, GB, vol. 158, No. 3, pp. A337-A342, 2011.
Extended European Search Report dated Apr. 20, 2016 by the European Patent Office in counterpart European Patent Application No. 13856347.3.
M.Q. Xu et al., "Performance improvement of lithium ion battery using PC as a solvent component and BS as an SEI forming additive", Journal of Power Sources, Elsevier SA, CH, vol. 174, No. 2, pp. 705-710, Dec. 2007.
H.B. Han et al., "Lithium bis(fluorosulfonyl)imide (LiFSI) as conducting salt for nonaqueous liquid electrolytes for lithium-ion batteries: Physicochemical and electrochemical properties", Journal of Power Sources, Elsevier SA, CH, vol. 196, No. 7, pp. 3623-3632, Dec. 2010.
Z. Chen et al., "Methods to obtain excellent capacity retention in $LiCoO_2$ cycled to 4.5 V", Electrochimicia Acta, Elsevier Science Publishers, Barking, GB, vol. 49, No. 7, pp. 1079-1090, Mar. 2004.
Extended European Search Report dated Jan. 14, 2016 by the European Patent Office in counterpart European Patent Application No. 13799816.7.
International Search Report dated Feb. 18, 2014 in corresponding PCT International application.
Chinese Office Action issued by the Chinese Patent Office in counterpart Chinese Patent Application No. 201380029910.6, dated Feb. 24, 2016.
Chinese Office Action issued by the Chinese Patent Office in counterpart Chinese Patent Application No. 201380060674.4, dated Jul. 6, 2016.
Non-Final Office Action dated Apr. 3, 2017, in U.S. Appl. No. 14/405,798.
Notification to Grant Patent Right for Invention, issued by the Chinese Patent Office, dated Jul. 10, 2017, for counterpart Chinese Patent Application No. 201380029910.6.
Japanese Office Action issued by the Japanese Patent Office in counterpart Japanese Patent Application No. 2014-520019, dated Apr. 25, 2017.
Notification to Grant Patent, issued by Japanese Patent Office, dated Oct. 31, 2017, for counterpart Japanese Patent Application No. 2014-548557.
Notification of Reasons for Refusal issued by Japanese Patent Office in counterpart Japanese Patent Application No. 2014-548556, dated Jan. 23, 2018.
Kiyoshi Kanamura, Jidosha Yo Lithium Ion Denchi (Lithium Ion Battery for Automobiles), Japan, Nikkan Kogyo Shimbun Ltd., Dec. 20, 2010, pp. 112-117.
Notice of Allowance issued from the U.S. Patent Office in U.S. Appl. No. 14/405,798, dated Oct. 12, 2017.

* cited by examiner

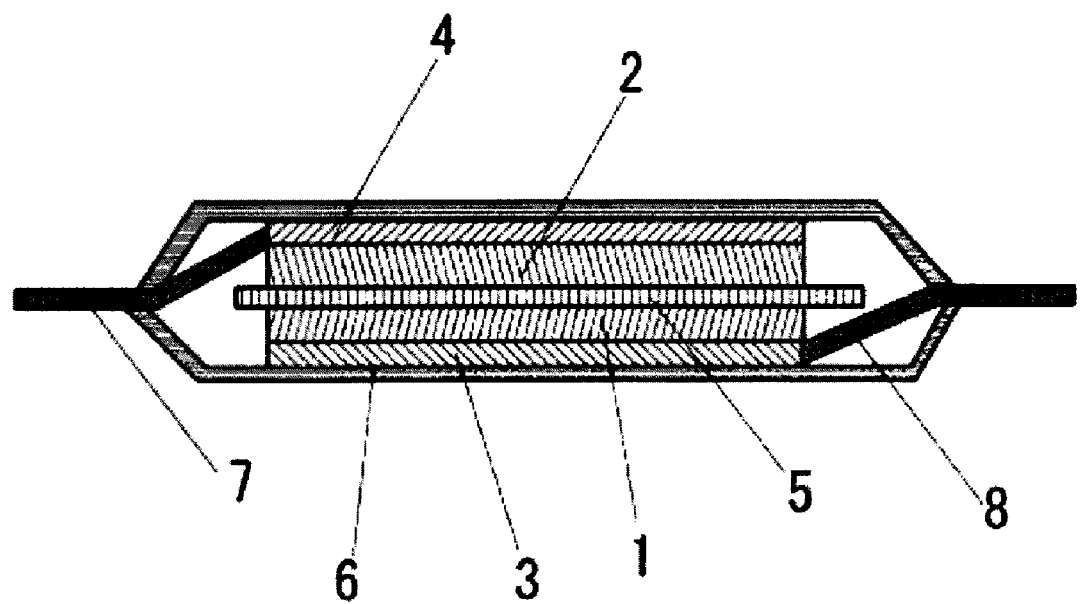

LITHIUM ION SECONDARY BATTERY

CROSS-REFERENCE TO RELATED PATENT APPLICATIONS

This application is a National Stage Entry of International Application No. PCT/JP2013/081086, filed Nov. 18, 2013, which claims priority from Japanese Patent Application No. 2012-254758, filed Nov. 20, 2012, and Japanese Patent Application No. 2013-054387, filed Mar. 15, 2013. The entire contents of the above-referenced applications are expressly incorporated herein by reference.

TECHNICAL FIELD

The present invention relates to a lithium ion secondary battery.

BACKGROUND ART

Lithium ion secondary batteries have been widely employed as power supplies for small devices because they have a small volume and a high mass capacity density and is capable of taking out a high voltage. For example, lithium ion secondary batteries have been used as power supplies for mobile devices such as cellular phones and notebook personal computers. In addition to the use in small mobile devices, in recent years, lithium ion secondary batteries have been expected to be applied to large-size secondary batteries in the fields where a large capacity and a long battery life are required such as electric vehicles (EVs) and electric power storage due to consideration for environmental issues and increasing awareness for energy saving.

In presently commercially available lithium ion secondary batteries, positive electrode active materials based on $LiMO_2$ with a layer structure (M is at least one of Co, Ni, and Mn) or $LiMn_2O_4$ with a spinel structure are generally used. Lithium ion secondary batteries having the positive electrode active material described above primarily use a charge/discharge region of 4.2 V or lower (hereinbelow, a positive electrode with an operating potential of 4.2 V or lower versus lithium metal will also be referred to as a "4 V-class positive electrode"). For negative electrode active materials, carbon materials such as graphite are used.

Meanwhile, materials in which a part of Mn of $LiMn_2O_4$ is replaced with Ni or the like are known to have a high charge/discharge region of 4.5 to 4.8 V versus lithium metal. Specifically, in spinel compounds such as $LiNi_{0.5}Mn_{1.5}O_4$, Mn is present in the state of $Mn^{4+}$, and oxidoreduction between $Ni^{2+}$ and $Ni^{4+}$ is used instead of the conventional oxidoreduction between $Mn^{3+}$ and $Mn^{4+}$, and therefore, a high operating voltage of 4.5 V or higher can be achieved. Such materials are referred to as "5 V-class active materials", and have been expected to be a promising positive electrode material because the energy density can be improved by the increased voltages. Hereinbelow, the positive electrode comprising a positive electrode active material that exhibits a high operating voltage of 4.5 V or higher versus lithium metal (which may also be referred to as a "5 V-class active material" or a "5 V-class positive electrode active material) may also be referred to as a "5 V-class positive electrode".

However, when the potential of a positive electrode becomes higher, there arises problems such as generation of gas due to oxidative degradation of the electrolyte solution, generation of byproducts due to decomposition of the electrolyte solution, elution of metal ions such as Mn and Ni from the positive electrode active material and their precipitation on a negative electrode, which leads to degradation of the battery capacity and generation of a large amount of gas associated with charge/discharge cycles at a temperature of 40° C. or higher, and these problems have been the obstacles to practical applications of the materials.

As a method of suppressing oxidative degradation of the electrolyte solution in the positive electrode at high potentials, use of a solvent with a high oxidation resistance can be employed. For example, Patent Literature 1 describes that an electrolyte solution which comprises a phosphate ester containing fluorine as halogen (hereinafter referred to as a "fluorinated phosphate ester") at 7 to 20% of the electrolyte solvent and further comprises chain esters and cyclic esters is a solvent having a high voltage resistance and is excellent in self-extinguishability. In Patent Literature 2, it is described that an electrolyte solution which comprises a fluorinated phosphate ester having a structure of a molecular chain terminal group of $CF_2H$—, a cyclic carbonate with a carbon-carbon $\pi$ bond, and a cyclic compound with an S=O bond has a high discharge capacity and is a solvent excellent in flame-resistant.

Generally, since it is assumed that a fluorinated solvent containing fluorine having a high electronegativity has a high voltage resistance, a solvent like this is expected to be suitable as a solvent for an electrolyte solution for the case where a 5 V-class positive electrode is used. Other examples of fluorinated solvents that can be used for lithium ion secondary batteries include the fluorinated ethers described in Patent Literatures 3 to 5. Patent Literature 6 describes a lithium secondary battery that comprises a positive electrode comprising a positive electrode active material operating at a potential of 4.5 V or higher versus lithium and a non-aqueous electrolyte solvent comprising a fluorine-containing phosphate ester.

However, since fluorinated solvents generally have a low dielectric constant and a low dissociation property of lithium salts, low compatibility with other solvents, and may have high viscosity in some cases, the ionic conductance becomes lower as compared to carbonate-based solvents that are usually used for lithium ion batteries. The fluorinated phosphate esters described above as a fluorinated solvent have higher dielectric constant and thus have a higher lithium ion dissociation property as compared to fluorinated ethers; however, the viscosity is high. On the other hand, although fluorinated ethers have a low viscosity, the dissociation property of lithium salts is low due to their low dielectric constant.

In order to inhibit generation of gas in 5 V-class positive electrodes at high temperatures, the concentration of a fluorinated solvent in the electrolyte solution is desirably as high as possible. However, when the concentration of the fluorinated solvent in the electrolyte solution is increased as described above, the ionic conductance of the electrolyte solution decreases, and thus, although it does become easier to achieve excellent charge-discharge characteristics at high temperatures, there has been a problem such that the charge-discharge characteristics at room temperature degrade and as the result, degradation of cycle characteristics at room temperature is caused. In addition, the fluorinated solvents with a high oxidation resistance may sometimes have a low resistance to reduction, and are decomposed by reduction on the negative electrode to form a film with a high resistance, which is considered as a cause of the degradation of cycle characteristics at room temperature. In other words, in lithium ion batteries that use a 5 V-class positive electrode, it has been a major problem to be solved to improve the cycle characteristics by inhibiting generation of gas in cycles at high temperatures and achieve excellent cycle characteristics at room temperature at the same time. However, in Patent Literatures 1 to 6, no specific description has been made as to these problems in lithium ion secondary batteries that use a 5 V-class positive electrode, and neither description nor suggestion of means for solving such problems has been given.

CITATION LIST

Patent Literature
Patent Literature 1; Japanese Patent No. 3821495
Patent Literature 2: Japanese Patent No. 4972915
Patent Literature 3: Japanese Patent No. 3304187
Patent Literature 4: Japanese Patent No. 4416991
Patent Literature 5: Japanese Patent Laid-Open No. 2003-100342
Patent Literature 6: International Publication No. WO 2012/077712

SUMMARY OF INVENTION

Technical Problem

An object of the present invention is to solve the above-described problems of lithium ion secondary batteries using a 5 V-class positive electrode, and to provide a lithium ion secondary battery having a high capacity retention ratio in cycles at room temperature and in which gas generation in cycles at high temperatures is suppressed.

Solution to Problem

An aspect of the present invention is as follows.
A lithium ion secondary battery comprising a positive electrode and a non-aqueous electrolyte solution comprising a non-aqueous electrolyte solvent, wherein
the positive electrode comprises a positive electrode active material with an operating potential of 4.5 V or higher versus lithium metal, and
the non-aqueous electrolyte solvent comprises:
a fluorinated phosphate ester represented by the following formula (1); and
at least one selected from the group consisting of a sulfone compound represented by the following formula (2) and a sulfone compound represented by the following formula (3), wherein
the sulfone compound is included in an amount of 5 volume % or higher in the non-aqueous electrolyte solvent.

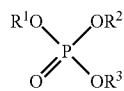
(1)

wherein $R^1$, $R^2$, $R^3$ each independently represent alkyl group or fluorinated alkyl group, and at least one thereof is fluorinated alkyl group,

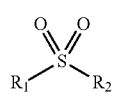
(2)

wherein $R_1$ and $R_2$ each independently represent substituted or unsubstituted alkyl group,

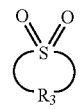
(3)

wherein $R_3$ represents substituted or unsubstituted alkylene group.

Advantageous Effects of Invention

The present invention is capable of improving cycle characteristics of a lithium ion secondary battery comprising a positive electrode active material which operates at a potential of 4.5 V or higher versus lithium.

BRIEF DESCRIPTION OF DRAWINGS

FIG. 1 is a cross section illustration of an example of a secondary battery according to an embodiment of the present invention.

DESCRIPTION OF EMBODIMENTS

A lithium ion secondary battery according to the present embodiment is a lithium ion secondary battery comprising a positive electrode and a non-aqueous electrolyte solution comprising a non-aqueous electrolyte solvent, wherein
the positive electrode comprises a positive electrode active material having an operating potential of 4.5 V or higher versus lithium metal, and
the non-aqueous electrolyte solvent comprises:
a fluorinated phosphate ester represented by the following formula (1); and
at least one selected from the group consisting of a sulfone compound represented by the following formula (2) and a sulfone compound represented by the following formula (3), wherein
the sulfone compound is included in an amount of 5 volume % or more in the non-aqueous electrolyte solvent:

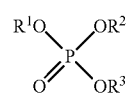
(1)

wherein $R^1$, $R^2$, $R^3$ each independently represent alkyl group or fluorinated alkyl group, and at least one thereof is fluorinated alkyl group,

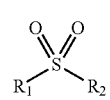
(2)

wherein $R_1$ and $R_2$ each independently represent substituted or unsubstituted alkyl group,

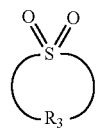

(3)

wherein $R_3$ represents substituted or unsubstituted alkylene group.

(Non-Aqueous Electrolyte Solution)

The non-aqueous electrolyte solution included in the lithium ion secondary battery according to the present embodiment comprises a fluorinated phosphate ester represented by the formula (1), and at least one selected from the group consisting of a sulfone compound represented by the formula (2) and a sulfone compound represented by the formula (3) as a non-aqueous electrolyte solvent. In the present specification, a "non-aqueous electrolyte solvent" may also be referred to as a "non-aqueous solvent" or a "solvent". A compound which contains fluorine used as the non-aqueous electrolyte solvent may also be referred to as a "fluorinated solvent" or a "fluorine solvent".

In the present embodiment, the non-aqueous solvent comprises a fluorinated phosphate ester represented by the following the formula (1) (hereinafter may also be simply referred to as a "fluorinated phosphate ester").

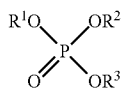

(1)

wherein $R^1$, $R^2$, $R^3$ each independently represent alkyl group or fluorinated alkyl group, and at least one thereof is fluorinated alkyl group.

In the formula (1), the fluorinated alkyl group is an alkyl group having at least one fluorine atom. In the formula (1), the carbon number of $R^1$, $R^2$, and $R^3$ is each independently preferably 1 to 3. At least one of $R^1$, $R^2$, and $R^3$ is preferably a fluorinated alkyl group in which 50% or more of hydrogen atoms of the corresponding unsubstituted alkyl group is substituted with fluorine atoms. More preferably, all of $R^1$, $R^2$, and $R^3$ are fluorinated alkyl group, and are fluorinated alkyl groups in which 50% or more of hydrogen atoms of the unsubstituted alkyl groups corresponding to the $R^1$, $R^2$ and $R^3$ is substituted with fluorine atoms. This is because, as the content of the fluorine atoms is higher, the voltage resistance can be more improved, and thus degradation of the battery capacity after cycles can be more suppressed even when a positive electrode active material operating at a potential of 4.5 V or higher versus lithium is used. More preferably, the ratio of the number of fluorine atoms in relation to the sum of the number of hydrogen atoms and the number of fluorine atoms in the fluorinated alkyl group is 55% or higher.

The fluorinated phosphate ester is not particularly limited, and examples thereof include fluorinated alkyl phosphate ester compounds such as tris(trifluoromethyl)phosphate, tris(pentafluoroethyl)phosphate, tris(2,2,2-trifluoroethyl)phosphate(TTFP), tris(2,2,3,3-tetrafluoropropyl)phosphate, tris(3,3,3-trifluoropropyl)phosphate, and tris(2,2,3,3,3-pentafluoropropyl)phosphate. Among them, tris(2,2,2-trifluoroethyl)phosphate(TTFP) is preferable as the fluorinated phosphate ester compound. The fluorinated phosphate esters can be used singly, or in combination of two or more.

As the content of the fluorinated phosphate ester included in the non-aqueous electrolyte solvent becomes higher, the oxidation resistance of the non-aqueous electrolyte solvent is improved, and thus generation of gas at high temperatures can be more suppressed. On the other hand, when the content of the fluorinated phosphate ester is too high, the ionic conductance degrades due to the increase of the viscosity and degradation of the dielectric constant of the electrolyte solution, and thus the internal resistance of the cells becomes high, which may lead to degradation of charge-discharge cycle characteristics at room temperature (approximately 20° C.) in some cases. Accordingly, the content of the fluorinated phosphate ester in the non-aqueous electrolyte solvent is preferably 5 volume % or more, preferably 10 volume % or more and 70 volume % or less, more preferably 10 volume % or more and 40 volume % or less, more preferably 10 volume % or more and 30 volume % or less, and also is more preferably 13 volume % or more and 60 volume % or less, and further preferably 16 volume % or more and 50 volume % or less.

In the present embodiment, the non-aqueous electrolyte solvent comprises at least one selected from the group consisting of a sulfone compound represented by the following formula (2) and a sulfone compound represented by the following formula (3) (hereinafter may also be simply referred to as a "sulfone compound").

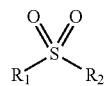

(2)

wherein $R_1$ and $R_2$ each independently represent substituted or unsubstituted alkyl group.

In the sulfone compound represented by the formula (2), the carbon number $n_1$ of $R_1$ and the carbon number $n_2$ of $R_2$ are preferably $1 \leq n_1 \leq 12$ and $1 \leq n_2 \leq 12$, more preferably $1 \leq n_1 \leq 6$ and $1 \leq n_2 \leq 6$, and further preferably $1 \, n_1 \leq 3$ and $1 \, n_2 \leq 3$, respectively. The alkyl group includes linear alkyl group, branched alkyl group, or cyclic alkyl group.

$R_1$ and $R_2$ may have a substituent, and examples of the substituent include alkyl group having 1 to 6 carbon atoms (for example, methyl group, ethyl group, propyl group, isopropyl group, butyl group, and isobutyl group), aryl group having 6 to 10 carbon atoms (for example, phenyl group and naphthyl group), and halogen atoms (for example, a chlorine atom, a bromine atom, and a fluorine atom), and alkyl group having 1 to 6 carbon atoms or aryl group having 6 to 10 carbon atoms is more preferable.

Examples of the sulfone compound represented by the formula (2) include ethyl methylsulfone, ethyl isopropylsulfone, ethyl isobutylsulfone, dimethylsulfone, and diethylsulfone. Among them, dimethylsulfone, ethyl methylsulfone, ethyl isopropylsulfone, and ethyl isobutylsulfone are preferable, and dimethylsulfone is more preferable.

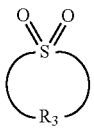

(3)

wherein $R_3$ represents substituted or unsubstituted alkylene group.

In $R_3$, the carbon number of the alkylene group is preferably 4 to 9, and more preferably 4 to 6.

In $R_3$, examples of the substituent include alkyl group having 1 to 6 carbon atoms (for example, methyl group, ethyl group, propyl group, isopropyl group, and butyl group) and halogen atoms (for example, a chlorine atom, a bromine atom, and a fluorine atom), and alkyl group having 1 to 6 carbon atoms is more preferable.

Among the sulfone compounds represented by the formula (3), a cyclic sulfone compound represented by the following formula (3-1) is preferable.

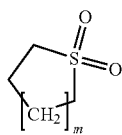

(3-1)

wherein m is an integer of 1 to 6.

In the formula (3-1), m is an integer of 1 to 6 and is preferably an integer of 1 to 3.

Examples of the cyclic sulfone compound represented by the formula (3) preferably include tetramethylene sulfone (sulfolane), pentamethylene sulfone, and hexamethylene sulfone, and sulfolane is more preferable. Examples of the cyclic sulfone compounds having a substituent preferably include 3-methyl sulfolane and 2,4-dimethyl sulfolane.

Since cyclic sulfone compounds have a high oxidation resistance, generation of gas in cycles at high temperatures can be more suppressed. Since chain sulfone compounds have a low viscosity as a solvent, cycle characteristics at room temperature can be more improved.

Sulfone compounds are compatible with fluorinated phosphate esters, and also have a relatively high dielectric constant, and thus have an advantage of being excellent in dissolution/dissociation of lithium salts. By using a mixture of a fluorinated phosphate ester and a sulfone compound, generation of gas at high temperatures can be suppressed and cycle characteristics at room temperature can be improved at the same time. On the other hand, cyclic carbonates such as ethylene carbonate (EC) and propylene carbonate (PC) have a dielectric constant higher than that of sulfone compounds and are compatible with fluorinated phosphate esters; however, the cycle characteristics at room temperature are low when those cyclic carbonates are used in combination with a fluorinated phosphate ester only. It is assumed that the synergistic effect obtained by a mixture of a fluorinated phosphate ester and a sulfone compound is produced based on solvation of lithium ions and structural change of SEI film on the negative electrode; however, details of the cause thereof are yet to be known.

The sulfone compounds can be used alone or as a mixture of two or more. In the present embodiment, the content of the sulfone compound is 5 volume % or more in the non-aqueous electrolyte solvent, and preferably 5 volume % or more and 40 volume % or less, more preferably 10 volume % or more and 30 volume % or less, more preferably 10 volume % or more and 25 volume % or less, and further preferably 15 volume % or more and 25 volume % or less. If the content of the sulfone compound is too low, the dielectric constant as an electrolyte solution decreases and thus it becomes difficult for the lithium salts to dissociate. On the other hand, if the content of the sulfone compound is too high, the viscosity of the electrolyte solution may become too high. In either of these cases, the cycle characteristics at room temperature may degrade.

In the present embodiment, the non-aqueous electrolyte solvent more preferably comprises a cyclic carbonate and/or a fluorinated ether represented by the formula (4) (hereinafter may also be simply referred to as a "fluorinated ether") in addition to the fluorinated phosphate ester and the sulfone compound. The compounds will be described below.

In the present embodiment, the electrolyte solution preferably comprises a cyclic carbonate as the non-aqueous electrolyte solvent. Examples of the cyclic carbonate include ethylene carbonate (EC), propylene carbonate (PC), butylene carbonate (BC), and vinylene carbonate (VC). Cyclic carbonates can be used alone or as a mixture two or more. Since EC and PC have a high dielectric constant and is excellent in electrolytic solubility, it is preferable to comprise at least EC, and can further comprise PC. Since PC has a high reactivity with graphite negative electrodes, if a large amount of PC is added, more gas may be generated at high temperatures and the cycle characteristics may degrade in some cases, and for this reason, PC should be used carefully in some cases. In the present embodiment, the cyclic carbonate included in a non-aqueous electrolyte solvent preferably comprises EC and PC as a main component (i.e., the total content of EC and PC in the cyclic carbonate is preferably 80 volume % or more), and the volume ratio is preferably EC:PC=100:0 to 40:60, and more preferably EC:PC=100:0 to 50:50. When described simply as a "cyclic carbonate" herein, it refers to a carbonate different from a fluorinated cyclic carbonate.

The content of the cyclic carbonate in the entire non-aqueous electrolyte solvent is preferably 40 volume % or less, preferably 1 to 30 volume %, more preferably 5 to 20 volume %, preferably 5 to 15 volume %, and further preferably 8 to 15 volume %. If the content of the cyclic carbonate is too small, the conductivity of electrolyte solution may decrease and thus the cycle characteristics at room temperature may degrade. On the other hand, if the content of the cyclic carbonate is too large, generation of gas may easily occur in lithium ion secondary batteries comprising a 5 V-class positive electrode active material because the cyclic carbonates are easy to degrade at high potentials.

In the present embodiment, the non-aqueous electrolyte solvent preferably comprises a fluorinated ether represented by the following formula (4). The fluorinated ether represented by the formula (4) herein may also be simply referred to as a "fluorinated ether".

$R_{101}$—O—$R_{102}$ (4)

wherein $R_{101}$ and $R_{102}$ of formula 4 each independently represent alkyl group or fluorinated alkyl group, and at least one of $R_{101}$ and $R_{102}$ of formula 4 is fluorinated alkyl group.

The sum of the carbon number of $R_{101}$ and $R_{102}$ of formula 4 is preferably 10 or less. In the formula (4), the alkyl group and the fluorinated alkyl group include linear group and branched group.

The fluorinated alkyl group is an alkyl group having at least one fluorine atom. In the formula (4), the content of the fluorine atom in the fluorinated alkyl group is preferably 50% or more, and more preferably 60% or more in relation to the total sum of the fluorine atoms and the hydrogen atoms. If the content of the fluorine atoms is high, the voltage resistance is more enhanced, and degradation of the battery capacity after cycles can be more effectively suppressed also in the case where a positive electrode active material operating at a potential of 4.5 V or higher versus lithium is used.

Among the fluorinated ethers, a fluorinated ether represented by the following formula (4-1) is more preferable.

$$X^1-(CX^2X^3)_n-O-(CX^4X^5)_m-X^6 \quad (4\text{-}1)$$

wherein n and m are each independently 1 to 8, $X^1$ to $X^6$ are each independently a fluorine atom or a hydrogen atom provided that at least one of $X^1$ to $X^6$ is a fluorine atom, and if n is 2 or greater, a plurality of $X^2$ and $X^3$ are independent from one another, and if m is 2 or greater, a plurality of $X^4$ and $X^5$ are independent from one another.

In view of the voltage resistance and the compatibility with other electrolytes, the fluorinated ether is more preferably a compound represented by the following formula (4-2).

$$X^1-(CX^2X^3)_n-CH_2O-CX^4X^5-CX^6X^7-X^8 \quad (4\text{-}2)$$

wherein n is 1 to 7 and $X^1$ to $X^8$ are each independently a fluorine atom or a hydrogen atom provided that at least one of $X^1$ to $X^3$ is a fluorine atom, and at least one of $X^4$ to $X^8$ is a fluorine atom.

In the formula (4-2), if n is 2 or greater, a plurality of $X^2$ may be the same or different from one another, and a plurality of $X^3$ may be the same or different from one another.

Furthermore, in view of the voltage resistance and the compatibility with other electrolytes, the fluorinated ether compound is further preferably represented by the following formula (4-3).

$$H-(CY^1Y^2-CY^3Y^4)_n-CH_2O-CY^5Y^6-CY^7Y^8-H \quad (4\text{-}3)$$

In the formula (4-3), n is 1, 2, 3, or 4. $Y^1$ to $Y^8$ are each independently a fluorine atom or a hydrogen atom. At least one of $Y^1$ to $Y^4$ is a fluorine atom and at least one of $Y^5$ to $Y^8$ is a fluorine atom.

In the formula (4-3), if n is 2 or greater, a plurality of $Y^1$ to $Y^4$ may be the same or different from one another.

Specific examples of the fluorinated ether include $CF_3OCH_3$, $CF_3OC_2H_5$, $F(CF_2)_2OCH_3$, $F(CF_2)_2OC_2H_5$, $CF_3(CF_2)CH_2O(CF_2)CF_3$, $F(CF_2)_3OCH_3$, $F(CF_2)_3OC_2H_5$, $F(CF_2)_4OCH_3$, $F(CF_2)_4OC_2H_5$, $F(CF_2)_5OCH_3$, $F(CF_2)_5OC_2H_5$, $F(CF_2)_8OCH_3$, $F(CF_2)_8OC_2H_5$, $F(CF_2)_9OCH_3$, $CF_3CH_2OCH_3$, $CF_3CH_2OCHF_2$, $CF_3CF_2CH_2OCH_3$, $CF_3CF_2CH_2OCHF_2$, $CF_3CF_2CH_2O(CF_2)_2H$, $CF_3CF_2CH_2O(CF_2)_2F$, $HCF_2CH_2OCH_3$, $(CF_3)(CF_2)CH_2O(CF_2)_2H$, $H(CF_2)_2OCH_2CH_3$, $H(CF_2)_2OCH_2CF_3$, $H(CF_2)_2CH_2OCHF_2$, $H(CF_2)_2CH_2O(CF_2)_2H$, $H(CF_2)_2CH_2O(CF_2)_3H$, $H(CF_2)_3CH_2O(CF_2)_2H$, $H(CHF)_2CH_2O(CF_2)_2H$, $(CF_3)_2CHOCH_3$, $(CF_3)_2CHCF_2OCH_3$, $CF_3CHFCF_2OCH_3$, $CF_3CHFCF_2OCH_2CH_3$, $CF_3CHFCF_2CH_2OCHF_2$, $CF_3CHFCF_2OCH_2(CF_2)_2F$, $CF_3CHFCF_2OCH_2CF_2CF_2H$, $H(CF_2)_4CH_2O(CF_2)_2H$, $CH_3CH_2O(CF_2)_4F$, $F(CF_2)_4CH_2O(CF_2)_2H$. Among them, $H(CF_2)_2CH_2O(CF_2)_2H$ is preferable as the fluorinated ether compound. The fluorinated ether compounds can be used alone or in combination of two or more.

The content of the fluorinated ether compound represented by the formula (4) may also be 0 volume % in the non-aqueous electrolyte solvent, preferably 20 volume % or more and 70 volume % or less, preferably 30 volume % or more and 60 volume % or less, and more preferably 40 volume % or more and 60 volume % or less. When the fluorinated ether is included, advantageous effects such as improved oxidation resistance and decreased viscosity of the electrolyte solution can be obtained; however, problems such as insufficient dissociation of the lithium salt due to the low dielectric constant, or lower compatibility with other non-aqueous solvents may arise. On the other hand, the solvent comprising the fluorinated phosphate ester and the sulfone compound is excellent in dielectric constant and compatibility with other non-aqueous solvents, but in some cases, has a high viscosity. Thus, by adding the fluorinated ether represented by the formula (4), the viscosity can be lowered, and the balance among the characteristics of the mixed solvent can be improved. Further, it is preferable to add a cyclic carbonate having a higher dielectric constant, within a range in which no adverse effect on the amount of gas generation at high temperatures is caused, into the mixed solvent comprising the fluorinated phosphate ester, the sulfone compound and the fluorinated ether because the ionic conductance can be more increased. As described above, by using a non-aqueous solvent preferably comprising the fluorinated ether and/or the cyclic carbonate in addition to the fluorinated phosphate ester and the sulfone compound, a lithium ion secondary battery in which gas generation at high temperatures is small and has a high capacity retention ratio in either of cycles at room temperature and in cycles at high temperatures can be provided.

As described above, according to one embodiment of the present invention, by employing the electrolyte solution comprising the non-aqueous solvent comprising all of the fluorinated phosphate ester, the sulfone compound, the cyclic carbonate, and the fluorinated ether for a lithium ion secondary battery with a 5 V-class positive electrode, an excellent balance among the oxidation resistance, the viscosity and the dissociation property of lithium salts can be achieved in the electrolyte solution, and thus the electrolyte solution can exert a particularly excellent performance as an electrolyte solution for lithium ion secondary battery.

In the present embodiment, an electrolyte solution in which the volume ratio among the cyclic carbonate (CC), the sulfone compound (SF), the fluorinated phosphate ester (FP), and the fluorinated ether (FE) is in a range of CC:SF:FP:FE=5 to 20:10 to 30:10 to 40:30 to 60 (volume %) is particularly preferable, and an electrolyte solution in which the volume ratio is in a range of CC:SF:FP:FE=5 to 15:15 to 25:10 to 30:40 to 60 (volume %) is further preferable.

In the present embodiment, the non-aqueous electrolyte solvent may further comprise a chain carbonate. The viscosity of the electrolyte solution can be reduced by adding a chain carbonate. Examples of the chain carbonate include dimethyl carbonate (DMC), diethyl carbonate (DEC), ethylmethyl carbonate (EMC), and dipropyl carbonate (DPC). However, since chain carbonates tend to generate gas more easily compared with cyclic carbonates, the concentration thereof in the electrolyte solution is preferably 10 volume % or less, more preferably 5 volume % or less, and it is further preferable to comprise substantially no chain carbonate. When described simply as a "chain carbonate" herein, it refers to a carbonate different from a "fluorinated chain carbonate".

In the present embodiment, the non-aqueous electrolyte solvent may comprise aliphatic carboxylic acid esters, γ-lactones, cyclic ethers, chain ethers other than those represented by the above formula (4), and the like. Examples of the aliphatic carboxylic acid esters include methyl formate, methyl acetate, ethyl propanoate, and derivatives (including fluorinated compounds) thereof. Examples of the γ-lactones include γ-butyrolactone and derivatives (including fluorinated compounds) thereof. Examples of the cyclic ethers include tetrahydrofuran, 2-methyltetrahydrofuran, and derivatives (including fluorinated compounds) thereof. Examples of the chain ethers include 1,2-ethoxyethane (DEE), ethoxymethoxyethane (EME), derivatives (including fluorinated compounds) thereof, and diethyl ether. These materials can be used alone or as a mixture of two or more.

In addition, as the non-aqueous electrolyte solvent, for example, one or a mixture of two or more selected from dimethylsulfoxide, 1,3-dioxolane, formamide, acetamide, dimethylformamide, dioxolane, acetonitrile, propionitrile, nitromethane, ethylmonoglyme, trimethoxymethane, dioxolane derivatives, 1,3-dimethyl-2-imidazolidinone, 3-methyl-2-oxazolidinone, propylene carbonate derivatives, tetrahydrofuran derivatives, anisole, N-methylpyrrolidone, and derivatives (including fluorinated compounds) thereof, and phosphoric acid triester can be used.

Further, an additive can be added to the electrolyte solution. As the additive, an additive capable of forming an SEI (solid electrolyte interface) film on an active material is preferable. In the case of using a 5 V-class positive electrode, the electrolyte solution may be degraded by oxidation on the positive electrode, and byproducts generated therefrom may leak out into the electrolyte solution and react with a negative electrode, and ions of transition metals such as Mn and Ni eluted from the positive electrode active material may deposit on the negative electrode, which tends to be the causes of degradation of the battery performance. SEI films have a function to inhibit these side reactions between the active materials and the electrolyte solution and improve the cycle characteristics.

In the present embodiment, the additive preferably includes at least one, and more preferably two or more kinds selected from cyclic sulfonic acid esters such as cyclic monosulfonic acid ester and cyclic disulfonic acid ester, compounds including an $N(SO_2F)_2$ anion (FSI anion), and fluorinated carbonates. Due to the difference of the reactivity of the additive on the reduction side and the oxidation side, an SEI film with a high quality can be formed on both the negative electrode and the positive electrode by using two or more additives in combination. If a conventional 4 V-class positive electrode is used, the effect of combined use of the additives described above is relatively small because degradation of the electrolyte solution on the oxidation side is smaller; however, in a case where a 5 V-class positive electrode is used, the effect of the combined use of the additives becomes significantly higher because the influence from the degradation of the electrolyte solution on the positive electrode side is significant.

As the additive for the electrolyte solution of the present embodiment, cyclic sulfonic acid esters represented by the following formula (5) can be used. It is considered that the cyclic sulfonic acid esters form a film primarily on the negative electrode, and some of them form a film also on the positive electrode.

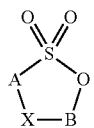

(5)

wherein A and B each independently represent alkylene group or fluorinated alkylene group, and X represents a single bond or —$OSO_2$— group.

In the formula (5), the carbon number of the alkylene group is 1 to 8 for example, preferably 1 to 6, and more preferably 1 to 4.

The fluorinated alkylene group refers to a substituted alkylene group having a structure in which at least one hydrogen atom of unsubstituted alkylene group is substituted with a fluorine atom. In the formula (5), the carbon number of the fluorinated alkylene group is 1 to 8 for example, preferably 1 to 6, and more preferably 1 to 4.

The —$OSO_2$— group may be in either orientation.

In the formula (5), if X is a single bond, the cyclic sulfonic acid ester is a cyclic monosulfonic acid ester, and the cyclic monosulfonic acid ester is preferably a compound represented by the following formula (5-1).

(5-1)

wherein $R_{101}$ and $R_{102}$ of formula 5-1 each independently represent a hydrogen atom, a fluorine atom, or alkyl group having 1 to 4 carbon atoms, and n is 0, 1, 2, 3, or 4.

In the formula (5), if X is —$OSO_2$— group, the cyclic sulfonic acid ester is a cyclic disulfonic acid ester, and the cyclic disulfonic acid ester is preferably a compound represented by the following formula (5-2).

(5-2)

wherein $R_{201}$ to $R_{204}$ each independently represent a hydrogen atom, a fluorine atom, or alkyl group having 1 to 4 carbon atoms, and n is 1, 2, 3, or 4, and if n is 2 or greater, a plurality of $R_{203}$ may be the same or different from one another, and a plurality of $R_{204}$ may be the same or different from one another.

Examples of the cyclic sulfonic acid esters include monosulfonic acid esters (when X in the formula (5) is a single bond) such as 1,3-propane sultone, 1,2-propane sultone, 1,4-butane sultone, 1,2-butane sultone, 1,3-butane sultone, 2,4-butane sultone, 1,3-pentane sultone, and disulfonic acid esters (when X in the formula (5) is —$OSO_2$— group) such as methylenemethane disulfonic acid ester and ethylenemethane disulfonic acid ester. Among them, in view of the effect of forming a film, the ease of availability, and the costs, 1,3-propane sultone (PS), 1,4-butane sultone (BS), and methylenemethane disulfonic acid ester (MMDS) are preferable. In particular, the cyclic disulfonic acid esters have a characteristic such that they easily form a film with an excellent quality on the negative electrode.

The content of the cyclic sulfonic acid ester in the electrolyte solution is preferably 0.1 to 5% by mass, more preferably 0.1 to 3% by mass, more preferably 0.2 to 3% by mass, and further preferably 0.3 to 2% by mass. If the content is too small, sufficient effect as a film cannot be obtained, and if the content is too large, the internal resistance may increase, and the excessive additive may react with the positive electrode and become a source of gas generation.

As the additive to the electrolyte solution of the present embodiment, a compound including an $N(SO_2F)_2$ anion (FSI anion) can be used. FSI anions can form a film on both the negative electrode and the positive electrode. FSI anions are generated by dissolving a compound including an FSI anion in a non-aqueous electrolyte solution. As the compound including FSI anions, a salt of an FSI anion and an alkali metal is preferable, and examples of such a compound include LiFSI, NaFSI, and KFSI. Among them, LiFSI is more preferable because it also acts as an electrolyte for lithium ion batteries and the ionic conductance of the electrolyte solution can be improved. In the present specification, some paragraphs are described by LiFSI as an example; however, these descriptions are not limited to LiFSI because the film of FSI anions can be formed by using a material other than lithium salts.

The content of LiFSI in the electrolyte solution is preferably 0.1 to 5% by mass, more preferably 0.2 to 3% by mass, and further preferably 0.3 to 2% by mass. If the content is too small, sufficient effect as a film may not be obtained. Excessive additive may react on the positive electrode and become a source of gas generation.

In the present embodiment, a fluorinated carbonate can be used as the additive to the electrolyte solution. The fluorinated carbonate is a compound in which a part of or the entire hydrogen of a cyclic or chain carbonate is substituted with fluorine. The fluorinated carbonate can form a film primarily on the negative electrode. As the fluorinated carbonate like this, cyclic fluorinated carbonates are preferable because they easily form a film on the negative electrode, and fluoroethylene carbonate and fluoropropylene carbonate are particularly preferable. The content of the fluorinated carbonate in the non-aqueous electrolyte solution is preferably 5% by mass or lower, preferably 3% by mass or lower, and more preferably 0.1 to 3% by mass. The fluorinated carbonate easily forms a film on the negative electrode. If the content of the fluorinated carbonate is too large, the resistance may become higher in some cases.

In the present embodiment, as the additive to the electrolyte solution, two or more of cyclic monosulfonic acid esters, cyclic disulfonic acid esters, LiFSI, and fluorinated carbonates can be used in combination, and for example, a combination of a cyclic disulfonic acid ester and a cyclic monosulfonic acid ester, a combination of a cyclic sulfonic acid ester (a cyclic monosulfonic acid ester and/or cyclic disulfonic acid ester) and LiFSI, and a combination of a fluorinated carbonate and LiFSI are particularly preferable. It is assumed that this is because a film with an excellent quality can be formed on both the negative electrode and the positive electrode in a well-balanced manner.

In the present embodiment, the non-aqueous electrolyte solution is a solution in which an electrolyte consisting of a lithium salt is dissolved in a non-aqueous electrolyte solvent. The lithium salt is not particularly limited, and examples of which include lithium imide salts (except for compounds including FSI anions), $LiPF_6$, $LiAsF_6$, $LiAlCl_4$, $LiClO_4$, $LiBF_4$, and $LiSbF_6$. Among them, $LiPF_6$ is preferable. Examples of the lithium imide salts include $LiN(C_kF_{2k+1}SO_2)(C_mF_{2m+1}SO_2)$ (k and m are each independently 1 or 2). The lithium salts can be used alone or in combination of two or more. The concentration of the lithium salt in the electrolyte solution is preferably 0.5 to 1.5 mol/L, and more preferably 0.7 to 1.2 mol/L. By controlling the concentration of the lithium salt within the above range, it becomes easier to control the density, the viscosity, the electric conductivity and the like within an appropriate range.

(Positive Electrode Active Material)

The positive electrode according to the present embodiment comprises a positive electrode active material with an operating potential of 4.5 V or higher versus lithium metal (5 V-class positive electrode active material). In other words, the positive electrode active material used in the present embodiment has a charge/discharge region at 4.5 V or higher versus lithium metal. In the present specification, the positive electrode comprising a positive electrode active material having an operating potential of 4.5 V or higher versus lithium metal (5 V-class positive electrode active material) is also referred to as a "5 V-class positive electrode".

The positive electrode active material operating at a potential of 4.5 V or higher versus lithium can be selected by the following method, for example. First, a positive electrode comprising a positive electrode active material and a Li metal are placed in a battery so as to face each other across a separator, then an electrolyte solution is injected therein to produce a battery. Thereafter, when charge/discharge is performed with, for example, a constant current of 5 mAh/g per mass of the positive electrode active material in the positive electrode, a material having a charge/discharge capacity of 10 mAh/g or more per mass of the active material at a potential of 4.5 V or more versus lithium can be considered to be a positive electrode active material which operates at a potential of 4.5 V or more versus lithium. Additionally, when charge/discharge is performed at a constant current of 5 mAh/g per mass of the positive electrode active material in the positive electrode, a charge/discharge capacity per mass of the active material at a potential of 4.5 V or more versus lithium is preferably 20 mAh/g or more, more preferably 50 mAh/g or more, and still more preferably 100 mAh/g or more. As the shape of the battery, a coin-type can be used, for example.

The positive electrode active material included in the 5 V-class positive electrode is preferably a lithium-containing complex oxide. Examples of the lithium-containing complex oxide which is a 5 V-class positive electrode active material include spinel-type lithium-manganese complex oxides, olivine-type lithium-manganese-containing complex oxides, inverse-spinel type lithium-manganese-containing complex oxides, and $Li_2MnO_3$-based solid solutions.

It is particularly preferable to use a lithium-manganese complex oxide represented by the following formula (6) as the positive electrode active material.

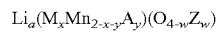

$$Li_a(M_xMn_{2-x-y}A_y)(O_{4-w}Z_w) \quad (6)$$

wherein $0.4 \leq x \leq 1.2$, $0 \leq y$, $x+y<2$, $0 \leq a \leq 1.2$, $0 \leq w \leq 1$, M is at least one selected from the group consisting of Co, Ni, Fe, Cr, and Cu, A is at least one selected from the group consisting of Li, B, Na, Mg, Al, Ti, Si, K, and Ca, and Z is at least one of F and Cl.

In the formula (6), for M, it is more preferable to include Ni only, or include at least one of Co and Fe with Ni as a main component. A is more preferably one or more of B, Mg, Al, and Ti. Z is more preferably F. Such substitution elements serve to stabilize the crystal structure and inhibit degradation of the active material.

The 5 V-class positive electrode active material can be a positive electrode active material other than those represented by the above formula (6) as long as the positive electrode active material has a charge/discharge region of 4.5 V (vs. Li/Li+) or higher versus lithium metal. Because the reactivity of the electrolyte solution and the additive is primarily affected by the potential rather than by the structure of the active material, it is considered that the electrolyte solution of the present embodiment is not directly influenced by the composition of the active material.

As other examples of the 5 V-class positive electrode active material, olivine-based complex oxides represented by $Li_xMPO_4F_y$ ($0 \leq x \leq 2$, $0 \leq y \leq 1$, M is at least one of Co and Ni); Si-containing complex oxides represented by $Li_xMSiO_4$ ($0 \leq x \leq 2$, M: at least one of Mn, Fe, and Co); layer-type complex oxides represented by $Li_x[Li_aM_bMn_{1-a-b}]O_2$ ($0 \leq x \leq 1$, $0.02 \leq a \leq 0.3$, $0.1 < b < 0.7$, M is at least one of Ni, Co, Fe, and Cr); and others can be used. The positive electrode active materials can be used alone or in combination of two or more types. In addition to the 5 V-class positive electrode active material described above, a 4 V-class positive electrode active material may be included.

Examples of the olivine type positive electrode active material include $LiCoPO_4$ and $LiNiPO_4$.

The average particle diameter ($D_{50}$) of the positive electrode active material is preferably 1 to 50 μm, and more preferably 5 to 25 μm. The average particle diameter ($D_{50}$) of the positive electrode active material can be measured by laser diffraction scattering method (microtracking method).

(Negative Electrode Active Material)

The negative electrode active material is not particularly limited, and carbon materials such as graphite or amorphous carbon can be used, for example. For the negative electrode active material, it is preferable to use graphite in view of the energy density. As the graphite, artificial graphite, natural graphite, graphite coated with amorphous carbon, and the like can be used. As the negative electrode active material, materials other than carbon materials such as materials that form an alloy with Li such as Si, Sn and Al; Si oxides; Si complex oxides including Si and an element of a metal other than Si; Sn oxides; Sn complex oxides including Sn and an element of a metal other than Sn; and $Li_4Ti_5O_{12}$; and complex materials in which the above materials are coated with carbon or the like can also be used. The negative electrode active materials can be used alone or in combination of two or more.

(Electrodes)

In the positive electrode, a positive electrode active material layer is formed on at least one surface of a positive electrode current collector, for example. The positive electrode active material layer is constituted by the positive electrode active material which is a main material, a binding agent (binder), and a conductive assistant, for example. In the negative electrode, a negative electrode active material layer is formed on at least one surface of a negative electrode current collector, for example. The negative electrode active material layer is constituted by the negative electrode active material which is a main material, a binding agent (binder), and a conductive assistant, for example.

Examples of the binding agent used in the positive electrode include polyvinylidene fluoride (PVDF) and acrylic-based polymers. These materials can be used by dissolving them in a solvent such as NMP. Binding agents that can be dissolved in a solvent such as NMP herein may be referred to as "solvent-based binders". For the binding agent used in the negative electrode, in addition to the solvent-based binders described above, an emulsion in which styrene-butadiene rubber (SBR), acrylate-based polymers or the like is dispersed in water can be used, for example. These are also referred to as water-based binders and are usually used in combination with thickeners such as carboxymethyl cellulose (CMC) to prepare electrode slurry.

In the present embodiment, it is preferable to use a water-based binder in producing the negative electrode. By using water-based binders, the concentration of the binder in an electrode mixture can be reduced to 1 to 2% by mass, and migration of lithium ions is less likely interfered, and thus, the water-based binders are more suitable for using with an electrolyte solution using a fluorinated solvent whose ionic conductance is easy to degrade. In addition, CMC used in combination with water-based binders covers the negative electrode active material, and serves to decrease the reactivity of the fluorinated solvent with the negative electrode, and improve the cycle characteristics. The concentration of the binder in the negative electrode mixture (in the total mass of the negative electrode active material, the negative electrode binder, and the conductive assistant that form the negative electrode active material layer) is preferably 1 to 10% by mass and more preferably 2 to 8% by mass in the case of using a solvent-based binder. In the case of using a water-based binder, the concentration of the binder is preferably 0.5 to 5% by mass, more preferably 1 to 3% by mass in the negative electrode mixture. CMC used in combination with the water-based binder may be a derivative of CMC, and sodium salts are usually used, and the concentration thereof is preferably 0.2 to 3% by mass, more preferably 0.5 to 2% by mass in the negative electrode mixture.

The concentration of the positive electrode binder is not particularly limited, and is preferably 1 to 10% by mass, and more preferably 2 to 8% by mass in the positive electrode mixture (in the total mass of the positive electrode active material, the positive electrode binder, and the conductive assistant material that form the positive electrode active material layer).

For the conductive assistant, for example, carbon materials such as carbon black, granular graphite, flaky graphite and carbon fibers can be used for both the positive electrode and the negative electrode. It is particularly preferable to use carbon black having a low crystallinity for the positive electrode.

For the positive electrode current collector, aluminum, stainless steel, nickel, titanium, or alloys thereof and the like can be used, for example. For the negative electrode current collector, copper, stainless steel, nickel, titanium, or alloys thereof and the like can be used, for example.

The electrodes can be obtained by dispersing and kneading the active material, the binding agent (binder), and the conductive assistant in a solvent such as N-methyl-2-pyrrolidone (NMP) or water in a prescribed blending amount, and applying slurry obtained thereby onto a current collector to form an active material layer. The obtained electrode can be compressed by methods such as roll pressing to adjust the density to an appropriate level.

(Separator)

The separator is not particularly limited, and for example, porous films constituted by polyolefins such as polypropylene and polyethylene, fluororesins, and the like, inorganic separators constituted by cellulose, glass, and the like can be used.

(Outer Package)

As the outer package, cans such as coin type cans, square cans, cylindrical cans, or laminate outer packages can be used for example, and in view of reduction in weight and improvement of the battery energy density, laminate outer packages that use a flexible film constituted by a laminate comprising a synthetic resin and a metal foil are preferable. Laminate type batteries are also excellent in heat radiation, and thus are suitable for an on-vehicle battery for electric vehicles and the like.

In the case of laminate type secondary batteries, for the outer package thereof, aluminum laminate films, laminate films made of SUS, laminate films made of polypropylene, polyethylene, and the like coated with silica or the like can be used, for example. In view of inhibition of volume expansion and the costs, it is particularly preferable to use aluminum laminate films.

(Secondary Battery)

The configuration of the lithium ion secondary battery according to the present embodiment is not particularly limited, and for example, a configuration in which an electrode element comprising a positive electrode and a negative electrode facing each other and an electrolyte solution are housed in an outer package can be employed. The shape of the secondary battery is not particularly limited, examples of which include a cylindrical shape, a flat wound square shape, a layered square shape, a coin type shape, a flat wound laminate shape, or a layered laminate shape.

FIG. 1 illustrates a laminate type secondary battery as an example of the secondary battery according to the present embodiment. In the secondary battery illustrated in FIG. 1, a separator 5 is inserted between a positive electrode and a negative electrode wherein the positive electrode is constituted by a positive electrode active material layer 1 comprising a positive electrode active material and a positive electrode binder, and a positive electrode current collector 3, and the negative electrode is constituted by a negative electrode active material layer 2 comprising a negative electrode active material capable of absorbing and releasing lithium, and a negative electrode current collector 4. The positive electrode current collector 3 is connected with a positive electrode tab 8, and the negative electrode current collector 4 is connected with a negative electrode tab 7. A laminate outer package 6 is used as the outer package, and the inside of the secondary battery is filled with the non-aqueous electrolyte solution according to the present embodiment.

(Method of Producing the Secondary Battery)

The production method of the secondary battery according to the present embodiment is not particularly limited, and examples of the method include the following method. The positive electrode tab and the negative electrode tab are respectively connected with the positive electrode for the secondary battery according to the present embodiment and the negative electrode via the positive electrode current collector and the negative electrode current collector. The positive electrode and the negative electrode are arranged so as to face each other across the separator to prepare an electrode layered body in which the electrodes are layered. The electrode layered body is housed in the inside of the outer package and then immersed into the electrolyte solution. The outer package is sealed such that a part of the positive electrode tab and the negative electrode tab is protruded toward the outside to produce a secondary battery.

EXAMPLES

Examples of the present embodiment will be described in detail below; however, the present embodiment is not limited to the following Examples.

Abbreviations of compounds used in the following examples (Working Examples 1 to 38 and Comparative Examples 1 to 9) will be described.
EC: Ethylene carbonate
PC: Propylene carbonate
DMC: Dimethyl carbonate
FE1: $H(CF_2)_2CH_2OCF_2CF_2H$
FE2: $CH_3CH_2O(CF_2)_4F$
FE3: $CF_3CHFCF_2OCH_2(CF_2)_2F$
FP1: $O=P(OCH_2CF_3)_3$
FP2: Tris(2,2,3,3-tetrafluoropropyl) phosphate
FP3: Tris(2,2,3,3,3-pentafluoropropyl) phosphate
SL: Sulfolane represented by $C_4H_8SO_2$
DMS: Dimethylsulfone
EMS: Ethyl methylsulfone Working Example 1

(Preparation of the Negative Electrode)

A natural graphite powder (average particle diameter (DO: 20 μm, specific surface area: 1 m$^2$/g) as the negative electrode active material and PVDF as the binding agent were uniformly dispersed in NMP at the mass ratio of 95:5 to prepare negative electrode slurry. This negative electrode slurry was applied onto both sides of a 15 μm-thick copper foil used as the negative electrode current collector, the resultant was dried at 125° C. for 10 minutes for evaporation of NMP to form a negative electrode active material layer, and further, the resultant was pressed to prepare a negative electrode. The weight of the negative electrode active material layer per unit area after the drying was 0.013 g/cm$^2$.

(Preparation of the Positive Electrode)

A $LiNi_{0.5}Mn_{1.5}O_4$ powder (average particle diameter ($D_{50}$): 10 μm, specific surface area: 0.5 m$^2$/g) as the positive electrode active material was prepared. The positive electrode active material, PVDF as the binder, and carbon black as the conductive assistant were uniformly dispersed in NMP at a mass ratio of 93:4:3 to prepare positive electrode slurry. This positive electrode slurry was applied onto both sides of a 20 μm-thick aluminum foil used as the positive electrode current collector, and then the resultant was dried at 125° C. for 10 minutes for evaporation of NMP to prepare a positive electrode. The weight of the positive electrode active material layer per unit area after the drying was 0.035 g/cm$^2$.

(Non-Aqueous Electrolyte Solution)

EC, sulfolane (SL), and tris(2,2,2-trifluoroethyl) phosphate which is a fluorinated phosphate ester represented by $O=P(OCH_2CF_3)_3$ (hereinafter referred to as "FP1") were mixed at a ratio of EC:SL:FP1=30:5:65 (volume ratio) to prepare a non-aqueous solvent. As the electrolyte, $LiPF_6$ was dissolved at a concentration of 1.0 mol/L.

(Preparation of the Laminate Type Battery)

The positive electrode and the negative electrode described above were cut into 1.5 cm×3 cm pieces. Four layers of the obtained positive electrode and five layers of the obtained negative electrode were alternately laminated together with a polypropylene porous film as the separator being inserted therebetween. End parts of the positive electrode current collectors not covered with the positive electrode active material and end parts of the negative electrode current collectors not covered with the negative electrode active material were respectively welded, and further, a positive electrode terminal made of aluminum and a negative electrode terminal made of nickel were respectively welded at the above welded portion to obtain an electrode element with a planar laminate structure. The above-described electrode element was wrapped with an aluminum laminate film as the outer package, the electrolyte solution was injected into the inside thereof, and then the outer package was sealed under reduced pressure to prepare a secondary battery.

(Initial Charge and Discharge)

After having charged the laminate type battery prepared in the above-described manner up to 4.75 V with a constant current of 16 mA equivalent to a 5 hour rate (0.2 C) at 20°

C., constant voltage charge at 4.75 V was performed for 8 hours in total, and then constant current discharge was performed to 3.0 V at 80 mA equivalent to 1 hour rate (1 C). (Cycle Test)

After the completion of the initial charge and discharge, a charge-discharge cycle in which the laminate type battery was charged up to 4.75 V at 1 C, then subjected to constant voltage charge at 4.75 V for 2.5 hours in total, and then subjected to constant current discharge to 3.0 V at 1 C was repeated 250 times at 20° C. or 45° C. A ratio of the discharge capacity after 250 cycles in relation to the initial discharge capacity was calculated as a capacity retention ratio (%). The volume of the cell after the initial charge and discharge and the volume after 250 cycles at 45° C. were determined, and the volume increase amount (cc) was determined from the difference between the cell volumes after the initial discharge and after the 250 cycles. The volume was measured by using the Archimedes method from the difference in the weights in water and in the air. The volume increase amount reflects the amount of gas generated inside the battery, which is better as the value is smaller. The gas generation amount was not measured for the 20° C. cycles because the amount of gas generated in 20° C. cycles was very small.

Working Example 2

A secondary battery was prepared by the same method as that in Working example 1 except that a non-aqueous solvent prepared by mixing EC, SL, and FP1 at a ratio of EC:SL:FP1=30:10:60 (volume ratio) was used, and evaluation was carried out.

Working Example 3

A secondary battery was prepared by the same method as that in Working example 1 except that a non-aqueous solvent prepared by mixing EC, SL, and FP1 at a ratio of EC:SL:FP1=30:20:50 (volume ratio) was used, and evaluation was carried out.

Working Example 4

A secondary battery was prepared by the same method as that in Working example 1 except that a non-aqueous solvent prepared by mixing EC, SL, and FP1 at a ratio of EC:SL:FP1=30:30:40 (volume ratio) was used, and evaluation was carried out.

Working Example 5

A secondary battery was prepared by the same method as that in Working Example 1 except that a non-aqueous solvent prepared by mixing EC, SL, and FP1 at a ratio of EC:SL:FP1=30:40:30 (volume ratio) was used, and evaluation was carried out.

Comparative Example 1

A secondary battery was prepared by the same method as that in Working Example 1 except that a non-aqueous solvent prepared by mixing EC and FP1 at a ratio of EC:FP1=30:70 (volume ratio) was used instead of the non-aqueous solvent of Working Example 1, and evaluation was carried out.

Comparative Example 2

A secondary battery was prepared by the same method as that in Working Example 1 except that a non-aqueous solvent prepared by mixing EC and SL at a ratio of EC:SL=30:70 (volume ratio) was used instead of the non-aqueous solvent of Working Example 1, and evaluation was carried out.

TABLE 1

| | EC (volume %) | SL (volume %) | FP1 (volume %) | FE1 (volume %) | Capacity retention ratio at 20° C. (%) | Capacity retention ratio at 45° C. (%) | Volume increase ratio at 45° C. (cc) |
|---|---|---|---|---|---|---|---|
| Com-Ex. 1 | 30 | 0 | 70 | 0 | 30 | 62 | 0.130 |
| Com-Ex. 2 | 30 | 70 | 0 | 0 | 33 | 51 | 0.310 |
| Wk-Ex. 1 | 30 | 5 | 65 | 0 | 45 | 62 | 0.149 |
| Wk-Ex. 2 | 30 | 10 | 60 | 0 | 51 | 61 | 0.157 |
| Wk-Ex. 3 | 30 | 20 | 50 | 0 | 53 | 59 | 0.163 |
| Wk-Ex. 4 | 30 | 30 | 40 | 0 | 47 | 56 | 0.183 |
| Wk-Ex. 5 | 30 | 40 | 30 | 0 | 42 | 54 | 0.220 |

Com-Ex.: Comparative Example
Wk-Ex.: Working Example

Results of the evaluation of battery characteristics of Comparative Examples 1 and 2 and Working Examples 1 to 5 are shown in Table 1. In the Comparative Example 1 in which the solvent was constituted by a cyclic carbonate (EC) and a fluorinated phosphate ester (FP1), the cycle characteristics at 45° C. were excellent but the capacity retention ratio of the cycle characteristics at 20° C. was low. In Comparative Example 2 in which the solvent was constituted by EC and a sulfone compound (SL), the characteristics at both 20° C. and 45° C. were low. On the other hand, in Working Examples 1 to 5 in which EC, SL, and FP1 were contained, although the volume increase amount at 45° C. was slightly increased compared with Comparative Example 1, the capacity retention ratio at 45° C. was excellent, and the capacity retention ratio in the 20° C. cycles was also improved compared with Comparative Examples 1 and 2. From these results, it was found that by containing both a sulfone compound and a fluorinated phosphate ester, the balance of the battery characteristics at room temperature and at high temperatures are improved and the practicability of the battery is greatly enhanced. It is considered that this was achieved because, by substituting a part of the fluorinated phosphate ester with the sulfone compound, the ionic conductance was improved without a significant degradation of the oxidation resistance of the fluorinated solvent. It was also shown that the content of the sulfone compound is especially preferably 10 to 30 volume % in the non-aqueous solvent.

Comparative Example 3

A secondary battery was prepared by the same method as that in Working Example 1 except that a non-aqueous solvent prepared by mixing EC and a fluorinated ether (FE1) represented by $H(CF_2)_2CH_2OCF_2CF_2H$ at a ratio of EC:FE1=20:80 (volume ratio) was used instead of the non-aqueous solvent of Working Example 1, and evaluation was carried out.

Comparative Example 4

A secondary battery was prepared by the same method as that in Working Example 1 except that a non-aqueous solvent prepared by mixing EC, FP1, and FE1 at a ratio of EC:FP1:FE1=20:30:50 (volume ratio) was used instead of the non-aqueous solvent of Working Example 1, and evaluation was carried out.

Comparative Example 5

A secondary battery was prepared by the same method as that in Working Example 1 except that a non-aqueous solvent prepared by mixing EC, SL, and FE1 at a ratio of EC:SL:FE1=20:20:60 (volume ratio) was used instead of the non-aqueous solvent of Working Example 1, and evaluation was carried out.

Working Example 6

A secondary battery was prepared by the same method as that in Working example 1 except that a non-aqueous solvent prepared by mixing EC, SL, FP1, and FE1 at a ratio of EC:SL:FP1:FE1=25:5:30:40 (volume ratio) was used instead of the non-aqueous solvent of Working Example 1, and evaluation was carried out.

Working Example 7

A secondary battery was prepared by the same method as that in Working Example 1 except that a non-aqueous solvent prepared by mixing EC, SL, FP1, and FE1 at a ratio of EC:SL:FP1:FE1=20:10:30:40 (volume ratio) was used instead of the non-aqueous solvent of Working Example 1, and evaluation was carried out.

Working Example 8

A secondary battery was prepared by the same method as that in Working Example 1 except that a non-aqueous solvent prepared by mixing EC, SL, FP1, and FE1 at a ratio of EC:SL:FP1:FE1=10:20:30:40 (volume ratio) was used instead of the non-aqueous solvent of Working Example 1, and evaluation was carried out.

Working Example 9

A secondary battery was prepared by the same method as that in Working Example 1 except that a non-aqueous solvent prepared by mixing EC, SL, FP1, and FE1 at a ratio of EC:SL:FP1:FE1=5:25:30:40 (volume ratio) was used instead of the non-aqueous solvent of Working Example 1, and evaluation was carried out.

TABLE 2

| | EC (volume %) | SL (volume %) | FP1 (volume %) | FE1 (volume %) | Capacity retention ratio at 20° C. (%) | Capacity retention ratio at 45° C. (%) | Volume increase ratio at 45° C. (cc) |
|---|---|---|---|---|---|---|---|
| Com-Ex. 3 | 20 | 0 | 0 | 80 | ND | ND | ND |
| Com-Ex. 4 | 20 | 0 | 30 | 50 | 35 | 64 | 0.128 |
| Com-Ex. 5 | 20 | 20 | 0 | 60 | 80 | 63 | 0.231 |
| Wk-Ex. 6 | 25 | 5 | 30 | 40 | 80 | 65 | 0.137 |
| Wk-Ex. 7 | 20 | 10 | 30 | 40 | 87 | 66 | 0.129 |
| Wk-Ex. 8 | 10 | 20 | 30 | 40 | 89 | 66 | 0.115 |
| Wk-Ex. 9 | 5 | 25 | 30 | 40 | 82 | 63 | 0.115 |

Com-Ex.: Comparative Example
Wk-Ex.: Working Example
ND: not determinable

Results of evaluation of the battery characteristics of Comparative Examples 3 to 5 and Working Examples 6 to 9 are shown in Table 2. In Comparative Example 3 in which the non-aqueous electrolyte solvent was constituted by EC and a fluorinated ether (FE1), the compatibility was low and a uniform solution was not obtained, and thus it was evaluated as not determinable. In Comparative Example 4 in which the non-aqueous electrolyte solvent was constituted by EC, a fluorinated phosphate ester, and a fluorinated ether, the characteristics at 45° C. were excellent; however, the capacity retention ratio in the 20° C. cycles was low. In Comparative Example 5 in which the non-aqueous electrolyte solvent was constituted by EC, a sulfone compound (SL), and a fluorinated ether (FE1), the capacity retention ratio in the 20° C. cycles was relatively good; however, the volume increase amount was relatively large. On the other hand, in Working Examples 6 to 9 in which all of EC, a sulfone compound (SL), a fluorinated phosphate ester (FP1), and fluorinated ether (FE1) were contained, the battery characteristics at both 20° C. and 45° C. were high, and a battery excellent in balance of temperature characteristics was obtained. It was also shown that the content of the cyclic carbonate (EC) is more preferable in the range of 5 to 20 volume % and the content of the sulfone compound (SL) is more preferable in the range of 10 to 25 volume %.

From the above-described results, it is considered that, by adding the fluorinated ether to the sulfone compound and the fluorinated phosphate ester, the viscosity was lowered while maintaining a high oxidation resistance of the electrolyte solution, and the balance among the characteristics such as the oxidation resistance, the ionic conductance and the viscosity was further improved. The reason why the battery characteristics in Working Examples 6 to 9 were better compared with Comparative Example 5 in which a sulfone compound, a fluorinated ether and a cyclic carbonate were contained is assumed that the dissociation property of lithium salts and the quality of the film on the negative electrode degrade in the case where only the fluorinated ether is used as the fluorinated solvent and no fluorinated phosphate ester is contained; however, detailed reasons therefor are yet to be understood.

Working Example 10

A secondary battery was prepared by the same method as that in Working Example 1 except that a non-aqueous solvent prepared by mixing EC, SL, FP1, and FE1 at a ratio of EC:SL:FP1:FE1=10:20:5:65 (volume ratio) was used, and evaluation was carried out.

Working Example 11

A secondary battery was prepared by the same method as that in Working Example 1 except that a non-aqueous solvent prepared by mixing EC, SL, FP1, and FE1 at a ratio of EC:SL:FP1:FE1=10:20:10:60 (volume ratio) was used, and evaluation was carried out.

Working Example 12

A secondary battery was prepared by the same method as that in Working Example 1 except that a non-aqueous solvent prepared by mixing EC, SL, FP1, and FE1 at a ratio of EC:SL:FP1:FE1=10:20:20:50 (volume ratio) was used, and evaluation was carried out.

Working Example 13

A secondary battery was prepared by the same method as that in Working Example 1 except that a non-aqueous solvent prepared by mixing EC, SL, FP1, and FE1 at a ratio of EC:SL:FP1:FE1=10:20:30:40 (volume ratio) was used, and evaluation was carried out.

Working Example 14

A secondary battery was prepared by the same method as that in Working Example 1 except that a non-aqueous solvent prepared by mixing EC, SL, FP1, and FE1 at a ratio of EC:SL:FP1:FE1=10:20:40:30 (volume ratio) was used, and evaluation was carried out.

Working Example 15

A secondary battery was prepared by the same method as that in Working Example 1 except that a non-aqueous solvent prepared by mixing EC, SL, FP1, and FE1 at a ratio of EC:SL:FP1:FE1=10:20:50:20 (volume ratio) was used, and evaluation was carried out.

Results of evaluation of the battery characteristics of Working Examples 10 to 15 are shown in Table 3. In all these Working Examples, the battery characteristics were excellent at 20° C. and 45° C. It was shown that the content of the fluorinated phosphate ester (FP1) is more preferable in the range of 10 to 40 volume % and further preferable in the range of 10 to 30 volume % in the non-aqueous electrolyte solvent. It was shown that the content of the fluorinated ether (FE1) is more preferable in the range of 30 to 60 volume % and further preferable in the range of 40 to 60 volume % in the non-aqueous electrolyte solvent.

Working Example 16

A secondary battery was prepared by the same method as that in Working Example 1 except that a non-aqueous solvent prepared by mixing EC, propylene carbonate (PC), SL, FP1, and FE1 at a ratio of EC:PC:SL:FP1:FE1=15:0:20:20:45 (volume ratio) was used as the cyclic carbonate, and evaluation was carried out.

Working Example 17

A secondary battery was prepared by the same method as that in Working Example 1 except that a non-aqueous solvent prepared by mixing EC, PC, SL, FP1, and FE1 at a ratio of EC:PC:SL:FP1:FE1=12:3:20:20:45 (volume ratio) was used, and evaluation was carried out.

Working Example 18

A secondary battery was prepared by the same method as that in Working Example 1 except that a non-aqueous solvent prepared by mixing EC, PC, SL, FP1, and FE1 at a ratio of EC:PC:SL:FP1:FE1=9:6:20:20:45 (volume ratio) was used, and evaluation was carried out.

Working Example 19

A secondary battery was prepared by the same method as that in Working Example 1 except that a non-aqueous solvent prepared by mixing EC, PC, SL, FP1, and FE1 at a ratio of EC:PC:SL:FP1:FE1=6:9:20:20:45 (volume ratio) was used, and evaluation was carried out.

TABLE 3

| | EC (volume %) | SL (volume %) | FP1 (volume %) | FE1 (volume %) | Capacity retention ratio at 20° C. (%) | Capacity retention ratio at 45° C. (%) | Volume increase ratio at 45° C. (cc) |
|---|---|---|---|---|---|---|---|
| Wk-Ex. 10 | 10 | 20 | 5 | 65 | 83 | 63 | 0.133 |
| Wk-Ex. 11 | 10 | 20 | 10 | 60 | 86 | 65 | 0.112 |
| Wk-Ex. 12 | 10 | 20 | 20 | 50 | 89 | 66 | 0.107 |
| Wk-Ex. 13 | 10 | 20 | 30 | 40 | 87 | 66 | 0.109 |
| Wk-Ex. 14 | 10 | 20 | 40 | 30 | 85 | 65 | 0.117 |
| Wk-Ex. 15 | 10 | 20 | 50 | 20 | 84 | 63 | 0.121 |

Wk-Ex.: Working Example

TABLE 4

| | EC (volume %) | PC (volume %) | SL/FP1/FE1 (volume %) | EC:PC (volume ratio) | Capacity retention ratio at 20° C. (%) | Capacity retention ratio at 45° C. (%) | Volume increase ratio at 45° C. (cc) |
|---|---|---|---|---|---|---|---|
| Wk-Ex. 16 | 15 | 0 | 20/20/45 | 100:0 | 87 | 66 | 0.122 |
| Wk-Ex. 17 | 12 | 3 | 20/20/45 | 80:20 | 89 | 65 | 0.115 |
| Wk-Ex. 18 | 9 | 6 | 20/20/45 | 60:40 | 89 | 64 | 0.105 |
| Wk-Ex. 19 | 6 | 9 | 20/20/45 | 40:60 | 82 | 62 | 0.102 |

Wk-Ex.: Working example

Results of evaluation of the battery characteristics of Working Examples 16 to 19 are shown in Table 4. In all these Working Examples, the battery characteristics were excellent at 20° C. and 45° C. It was shown that the ratio between EC and PC in the cyclic carbonate is preferable in the range of EC:PC=100:0 to 50:50.

Working Example 20

A secondary battery was prepared by the same method as that in Working Example 12 except that 1,3-propane sultone (PS) of 1% by mass in relation to the total mass of the electrolyte solution was added as an additive, and evaluation was carried out.

Working Example 21

A secondary battery was prepared by the same method as that in Working Example 12 except that methylenemethane disulfonic acid ester (MMDS) of 1% by mass in relation to the total mass of the electrolyte solution was added as an additive, and evaluation was carried out.

Working Example 22

A secondary battery was prepared by the same method as that in Working Example 12 except that LiFSI of 1% by mass in relation to the total mass of the electrolyte solution was added as an additive, and evaluation was carried out.

Working Example 23

A secondary battery was prepared by the same method as that in Working Example 12 except that monofluoroethylene carbonate (FEC) of 1% by mass in relation to the total mass of the electrolyte solution was added as an additive, and evaluation was carried out.

Working Example 24

A secondary battery was prepared by the same method as that in Working Example 12 except that PS of 0.5% by mass and MMDS of 0.5% by mass in relation to the total mass of the electrolyte solution were added as an additive, and evaluation was carried out.

Working Example 25

A secondary battery was prepared by the same method as that in Working Example 12 except that PS of 0.5% by mass and LiFSI of 0.5% by mass in relation to the total mass of the electrolyte solution were added as an additive, and evaluation was carried out.

Working Example 26

A secondary battery was prepared by the same method as that in Working Example 12 except that PS of 0.5% by mass and FEC of 0.5% by mass in relation to the total mass of the electrolyte solution were added as an additive, and evaluation was carried out.

Working Example 27

A secondary battery was prepared by the same method as that in Working Example 12 except that MMDS of 0.5% by mass and LiFSI of 0.5% by mass in relation to the total mass of the electrolyte solution were added as an additive, and evaluation was carried out.

Working Example 28

A secondary battery was prepared by the same method as that in Working Example 12 except that MMDS of 0.5% by mass and FEC of 0.5% by mass in relation to the total mass of the electrolyte solution were added as an additive, and evaluation was carried out.

Working Example 29

A secondary battery was prepared by the same method as that in Working Example 12 except that LiFSI of 0.5% by mass and FEC of 0.5% by mass in relation to the total mass of the electrolyte solution were added as an additive, and evaluation was carried out.

TABLE 5

| | EC/SL/FP1/FE1 (volume %) | Additive agent 1 | Additive agent 2 | Capacity retention ratio at 20° C. (%) | Capacity retention ratio at 45° C. (%) | Volume increase ratio at 45° C. (cc) |
|---|---|---|---|---|---|---|
| Wk-Ex. 20 | 10/20/20/50 | PS | — | 88 | 67 | 0.098 |
| Wk-Ex. 21 | 10/20/20/50 | MMDS | — | 90 | 69 | 0.089 |
| Wk-Ex. 22 | 10/20/20/50 | LiFSI | — | 90 | 71 | 0.072 |
| Wk-Ex. 23 | 10/20/20/50 | FEC | — | 87 | 68 | 0.101 |
| Wk-Ex. 24 | 10/20/20/50 | PS | MMDS | 90 | 73 | 0.060 |
| Wk-Ex. 25 | 10/20/20/50 | PS | LiFSI | 87 | 72 | 0.064 |
| Wk-Ex. 26 | 10/20/20/50 | PS | FEC | 90 | 69 | 0.089 |
| Wk-Ex. 27 | 10/20/20/50 | MMDS | LiFSI | 90 | 73 | 0.062 |

TABLE 5-continued

|  | EC/SL/FP1/FE1 (volume %) | Additive agent 1 | Additive agent 2 | Capacity retention ratio at 20° C. (%) | Capacity retention ratio at 45° C. (%) | Volume increase ratio at 45° C. (cc) |
|---|---|---|---|---|---|---|
| Wk-Ex. 28 | 10/20/20/50 | MMDS | FEC | 87 | 69 | 0.088 |
| Wk-Ex. 29 | 10/20/20/50 | LiFSI | FEC | 88 | 71 | 0.070 |

Wk-Ex.: Working Example

Results of evaluation of the battery characteristics of Working Examples 20 to 29 are shown in Table 5. In all of Working Examples 20 to 29, the battery characteristics at 45° C. were higher than those in Working Example 12. In all of Working Examples 20 to 29, the battery characteristics at 20° C. were excellent. For the cases of using one additive, the cases of using cyclic disulfonic acid ester (MMDS) or LiFSI were particularly excellent. The battery characteristics tended to be greatly improved in the cases where two kinds of additives were used compared to the cases where one additive was used, and the combination of cyclic monosulfonic acid ester (PS) and cyclic disulfonic acid ester (MMDS), the combination of cyclic sulfonic acid ester (PS or MMDS) and LiFSI, and the combination of LiFSI and FEC were particularly excellent. It is considered that this was because a film of an excellent quality was formed on both the negative electrode and the positive electrode.

Comparative Example 6

A secondary battery was prepared by the same method as that in Working Example 1 except that the non-aqueous electrolyte solvent was prepared by mixing EC as cyclic carbonate, dimethyl carbonate (DMC) as chain carbonate, fluorinated phosphate ester (FP1), and fluorinated ether (FE1) at a ratio of EC:DMC:FP1:FE1=30:10:40:20 (volume ratio) and that MMDS of 0.67% by mass in relation to the total mass of the electrolyte solution was added, and evaluation was carried out. As a result, the capacity retention ratio at 20° C. was 90%, the capacity retention ratio at 45° C. was 63%, and the volume increase amount at 45° C. was 0.302 cc, and although the cycle characteristic at 20° C. was high, the volume increase amount in the 45° C. cycles was large. It was found that the amount of gas generation remarkably increases by substituting the sulfone compound with a chain carbonate even if the additive (cyclic disulfonic acid ester) is contained. From this, it was found that it is preferable to contain a sulfone compound as the solvent and to include substantially no chain carbonate.

Comparative Example 7

A secondary battery was prepared by the same method as that in Working Example 1 except that the non-aqueous electrolyte solvent was prepared by mixing EC, FP1, and FE1 at a ratio of EC:FP1:FE1=30:50:20 (volume ratio) and that PS of 3% by mass in relation to the total mass of the electrolyte solution was added, and the cycle characteristics at 20° C. were evaluated. As a result, the capacity retention ratio at 20° C. was 35%. Even if a cyclic sulfonic acid ester (PS) was added by 3% by mass, the cycle characteristics at 20° C. were low in the case where a sulfone compound was not contained.

Working Example 30

A secondary battery was prepared by the same method as that in Working Example 12 except that tris(2,2,3,3-tetrafluoropropyl)phosphate (FP2) was used as the fluorinated phosphate ester instead of FP1, and evaluation was carried out.

Working Example 31

A secondary battery was prepared by the same method as that in Working Example 12 except that tris(2,2,3,3,3-pentafluoropropyl)phosphate (FP3) was used as the fluorinated phosphate ester instead of FP1, and evaluation was carried out.

Working Example 32

A secondary battery was prepared by the same method as that in Working Example 12 except that $CH_3CH_2O(CF_2)_4F$ (FE2) was used as the fluorinated ether instead of FE1, and evaluation was carried out.

Working Example 33

A secondary battery was prepared by the same method as that in Working Example 12 except that $CF_3CHFCF_2OCH_2(CF_2)_2F$ (FE3) was used as the fluorinated ether instead of FE1, and evaluation was carried out.

Working Example 34

A secondary battery was prepared by the same method as that in Working Example 12 except that dimethylsulfone (DMS) was used instead of SL as the sulfone compound, and evaluation was carried out.

Working Example 35

A secondary battery was prepared by the same method as that in Working Example 12 except that ethyl methylsulfone (EMS) was used instead of SL as the sulfone compound, and evaluation was carried out.

TABLE 6

|  | SF 20 v % | FP 20 v % | FE 50 v % | Capacity retention ratio at 20° C. (%) | Capacity retention ratio at 45° C. (%) | Cell expansion at 45° C. (cc) |
|---|---|---|---|---|---|---|
| Wk-Ex. 30 | SL | FP2 | FE1 | 87 | 64 | 0.117 |
| Wk-Ex. 31 | SL | FP3 | FE1 | 85 | 63 | 0.122 |
| Wk-Ex. 32 | SL | FP1 | FE2 | 86 | 63 | 0.124 |

TABLE 6-continued

|  | SF 20 v % | FP 20 v % | FE 50 v % | Capacity retention ratio at 20° C. (%) | Capacity retention ratio at 45° C. (%) | Cell expansion at 45° C. (cc) |
|---|---|---|---|---|---|---|
| Wk-Ex. 33 | SL | FP1 | FE3 | 86 | 63 | 0.115 |
| Wk-Ex. 34 | DMS | FP1 | FE1 | 89 | 66 | 0.118 |
| Wk-Ex. 35 | EMS | FP1 | FE1 | 89 | 65 | 0.127 |

In Working Examples 30 to 35, the non-aqueous electrolyte solutions respectively contain ethylene carbonate (EC), a sulfone compound (SF), a fluorinated phosphate ester (FP) and a fluorinated ether (FE) in a volume ratio at EC:SF:FP:FE = 10:20:20:50.
Wk-Ex.: Working Example Results of evaluation of the battery characteristics of Working Examples 30 to 35 are shown in Table 6. The battery characteristics at 20° C. and 45° C. were relatively good for different types of sulfone compounds, fluorinated phosphate esters, and fluorinated ethers. Among them, the combination of SL, FP1, and FE1 of Working Example 12 was the most excellent.

Comparative Example 8

A secondary battery was prepared by the same method as that in Comparative Example 4 except that $LiCoPO_4$ was used as the positive electrode active material instead of $LiNi_{0.5}Mn_{1.5}O_4$ and that the upper limit voltage was set to 5.1 V and the capacity retention ratio after 100 cycles at 20° C. was evaluated, and evaluation was carried out.

Working Example 36

A secondary battery was prepared by the same method as that in Working Example 12 except that $LiCoPO_4$ was used as the positive electrode active material instead of $LiNi_{0.5}Mn_{1.5}O_4$ and that the upper limit voltage was set to 5.1 V and the capacity retention ratio after 100 cycles at 20° C. was evaluated, and evaluation was carried out.

Comparative Example 9

A secondary battery was prepared by the same method as that in Comparative Example 8 except that $Li(Li_{0.15}Ni_{0.2}Mn_{0.65})O_2$ was used instead of $LiCoPO_4$ as the positive electrode active material, that the weight of the positive electrode active material layer per unit area was 0.025 g/cm², and that the upper limit voltage was 4.7 V and the lower limit voltage was 2.5 V, and evaluation was carried out.

Working Example 37

A secondary battery was prepared by the same method as that in Working Example 36 except that $Li(Li_{0.15}Ni_{0.2}Mn_{0.65})O_2$ was used instead of $LiCoPO_4$ as the positive electrode active material, that the weight of the positive electrode active material layer per unit area was 0.025 g/cm², and that the upper limit voltage was 4.7 V and the lower limit voltage was 2.5 V, and evaluation was carried out.

TABLE 7

|  | Positive electrode material | Upper limit voltage (V) | EC/SL/ FP1/FE1 | Capacity retention ratio at 20° C. (%) 100 cycle |
|---|---|---|---|---|
| Com-Ex. 8 | $LiCoPO_4$ | 5.1 | 20/0/30/50 | 21 |
| Wk-Ex. 36 | $LiCoPO_4$ | 5.1 | 10/20/20/50 | 82 |
| Com-Ex. 9 | $Li(Li_{0.15}Ni_{0.2}Mn_{0.65})O_2$ | 4.7 | 20/0/30/50 | 25 |
| Wk-Ex. 37 | $Li(Li_{0.15}Ni_{0.2}Mn_{0.65})O_2$ | 4.7 | 10/20/20/50 | 73 |

Com-Ex.: Comparative Example
Wk-Ex.: Working example

The capacity retention ratios after 100 cycles at 20° C. of Comparative Examples 8 and 9 and Working Examples 36 and 37 are shown in Table 7. It was confirmed that also in the cases where olivine type $LiCoPO_4$ or layer-structured $Li(Li_{0.15}Ni_{0.2}Mn_{0.65})O_2$ was used as the positive electrode active material, the cycle characteristics at 20° C. were more excellent in the Working Examples containing both the sulfone compound (SL) and the fluorinated phosphate ester (FP1). Accordingly, it is considered that the invention of the present application is similarly effective for the positive electrode having a high voltage of 4.5 V or higher versus Li metal regardless of the composition of the active material.

Working Example 38

An SBR-based emulsion in which fine particles of styrene-butadiene rubber (SBR) were emulsified and dispersed in water was prepared as the negative electrode binder, and a carboxymethylcellulose sodium salt (CMC) was prepared as the thickener. A secondary battery was prepared by the same method as that in Working Example 12 except that the negative electrode used was obtained in such a manner that graphite, SBR, and CMC were dispersed and mixed in water to prepare electrode slurry at the ratio of solid content of 97.5:1.5:1 (% by mass), and the obtained slurry was applied onto the current collector and dried at 50° C. for 10 minutes and then at 100° C. for 10 minutes, and evaluation was carried out.

As the result, the capacity retention ratio at 20° C. was 90%, the capacity retention ratio at 45° C. was 69%, and the volume increase amount at 45° C. was 0.932 cc. The battery characteristics were higher when the water-based binder was used compared to Working Example 12 in which PVDF was used as the negative electrode binder. It is considered that this was because the lithium ions were able to easily migrate because the concentration of the binder in the electrode was lower than that in the case of using PVDF, and because reactions of graphite with the electrolyte solution or byproducts generated from the positive electrode were inhibited by CMC covering the graphite.

Further, specific examples of the present embodiment will be described below.

Abbreviations of the compounds used in Examples 39 to 51 are as follows.
EC: Ethylene carbonate
DMC: Dimethyl carbonate
FE1: $H(CF_2)_2CH_2OCF_2CF_2H$
FE2: $CH_3CH_2O(CF_2)_4F$
FP: $O=P(OCH_2CF_3)_3$
SL: Sulfolane represented by $C_4H_8SO_2$
DMS: Dimethylsulfone
EMS: Ethyl methylsulfone
EiPS: Ethyl isopropylsulfone Example 39

Preparation of the Negative Electrode

A natural graphite powder (average particle diameter ($D_{50}$): 20 μm, specific surface area: 1 m²/g) as the negative electrode active material and PVDF as the binding agent were uniformly dispersed in NMP at the mass ratio of 95:5 to prepare negative electrode slurry. The negative electrode slurry was applied onto both sides of a 15 μm-thick copper foil used as the negative electrode current collector, the resultant was dried at 125° C. for 10 minutes for evaporation of NMP to form a negative electrode active material layer, and further, the layer was pressed to prepare a negative electrode. The weight of the negative electrode active material layer per unit area after the drying was 0.015 g/cm².
(Preparation of the Positive Electrode)

A $LiNi_{0.5}Mn_{1.5}O_4$ powder (average particle diameter ($D_{50}$): 10 μm, specific surface area: 0.5 m²/g) as the positive electrode active material was prepared. The positive electrode active material, PVDF as the binding agent, and carbon black as the conductive assistant were uniformly dispersed in NMP at a mass ratio of 93:4:3 to prepare positive electrode slurry. This positive electrode slurry was applied onto both sides of a 20 μm-thick aluminum foil used as the positive electrode current collector, and then the resultant was dried at 125° C. for 10 minutes for evaporation of NMP to prepare a positive electrode. The weight of the positive electrode active material layer per unit area after the drying was 0.040 g/cm².
(Non-Aqueous Electrolyte Solution)

EC, propylene carbonate (PC), a fluorinated ether FE1 represented by $H(CF_2)_2CH_2OCF_2CF_2H$, FP represented by $O=P(OCH_2CF_3)_3$, and a cyclic sulfone compound (sulfolane, SL) represented by $C_4H_8SO_2$ were mixed at a ratio of EC:PC:SL:FE1:FP=10:10:10:40:30 (volume ratio) to prepare a non-aqueous solvent. As the electrolyte, $LiPF_6$ was dissolved at a concentration of 0.8 mol/L. In this electrolyte solution, LiFSI was dissolved by 1% by mass in relation to the total mass of the non-aqueous electrolyte solution as an additive to prepare the non-aqueous electrolyte solution.
(Preparation of the Laminate Type Battery)

The positive electrode and the negative electrode described above were cut into 1.5 cm×3 cm pieces. 5 layers of the obtained positive electrode and 6 layers of the obtained negative electrode were alternately laminated together with polypropylene porous film as the separator being inserted therebetween. End parts of the positive electrode current collectors not covered with the positive electrode active material and end parts of the negative electrode current collectors not covered with the negative electrode active material were respectively welded, and further, a positive electrode terminal made of aluminum and a negative electrode terminal made of nickel were respectively welded at the above welded portion to obtain an electrode element with a planar laminate structure. The above-described electrode element was wrapped with an aluminum laminate film as the outer package, the electrolyte solution was injected into the inside thereof, and then the outer package was sealed under reduced pressure to prepare a secondary battery.
(Initial Charge and Discharge)

After having charged the laminate type battery prepared in the above-described manner up to 4.75 V with a constant current of 16 mA equivalent to a 5 hour rate (0.2 C) at 20° C., constant voltage charge at 4.75 V was performed for 8 hours in total, and then constant current discharge was performed to 3.0 V at 80 mA equivalent to 1 hour rate (1 C).
(Cycle Test)

After the completion of the initial charge and discharge, a charge-discharge cycle in which the laminate type battery was charged up to 4.75 V at 1 C, then subjected to constant voltage charge at 4.75 V for 2.5 hours in total, and then subjected to constant current discharge to 3.0 V at 1 C was repeated 300 times at 45° C. A ratio of the discharge capacity after 300 cycles in relation to the initial discharge capacity was calculated as a capacity retention ratio (%). The volume of the cell after the initial charge and discharge and the volume after 300 cycles were determined, and the volume increase ratio (%) of the cell after 300 cycles in relation to the cell volume after the initial discharge was calculated. The volume was measured by using the Archimedes method from the difference in the weights in water and in the air.

Example 40

A secondary battery was prepared by the same method as that in Example 39 except that LiFSI was not added, and evaluation was carried out.

Example 41

A secondary battery was prepared by the same method as that in Example 39 except that methylenemethane disulfonic acid ester (MMDS) was added by 1% by mass in relation to the total mass of the non-aqueous electrolyte solution instead of LiFSI of Example 39, and evaluation was carried out.

Example 42

A secondary battery was prepared by the same method as that in Working Example 39 except that LiFSI of 0.5% by mass and MMDS of 0.5% by mass in relation to the total mass of the non-aqueous electrolyte solution were added as an additive instead of the additive of Example 39, and evaluation was carried out.

Example 43

A secondary battery was prepared by the same method as that in Example 42 except that a non-aqueous solvent prepared by mixing EC, FE1, FP, and SL at a volume ratio of EC:SL:FE1:FP=10:20:40:30 was used instead of the non-aqueous solvent of Working Example 42, and evaluation was carried out.

Results of Examples 39 to 43 are shown in Table 8.

TABLE 8

| | Non-aqueous solvent (volume ratio) | Additive agent | Capacity retention ratio (%) | Volume increase ratio (%) |
|---|---|---|---|---|
| Ex. 40 | EC/PC/SL/FE1/FP = 1/1/1/4/3 | — | 56 | 40 |
| Ex. 41 | EC/PC/SL/FE1/FP = 1/1/1/4/3 | MMDS | 63 | 31 |
| Ex. 39 | EC/PC/SL/FE1/FP = 1/1/1/4/3 | LiFSI | 65 | 16 |
| Ex. 42 | EC/PC/SL/FE1/FP = 1/1/1/4/3 | MMDS + LiFSI | 68 | 12 |

TABLE 8-continued

| Non-aqueous solvent (volume ratio) | Additive agent | Capacity retention ratio (%) | Volume increase ratio (%) |
|---|---|---|---|
| Ex. 43 | EC/SL/FE1/FP = 1/2/4/3 | MMDS + LiFSI | 69 | 10 |

Ex.: Example

Example 44

A secondary battery was prepared by the same method as that in Example 42 except that $CH_3CH_2O(CF_2)_4F$ (FE2) was used as the fluorinated ether instead of FE1, and evaluation was carried out.

Example 45

A secondary battery was prepared by the same method as that in Example 42 except that $H(CF_2)_4CH_2O(CF_2)_2H$ was used as the fluorinated ether instead of FE1, and evaluation was carried out.

Example 46

A secondary battery was prepared by the same method as that in Example 42 except that $CF_3CHFCF_2OCH_2(CF_2)_2F$ was used as the fluorinated ether instead of FE1, and evaluation was carried out.

Example 47

A secondary battery was prepared by the same method as that in Example 42 except that dimethylsulfone (DMS) was used as the sulfone compound instead of SL, and evaluation was carried out.

Example 48

A secondary battery was prepared by the same method as that in Example 42 except that ethyl methylsulfone (EMS) was used as the sulfone compound instead of SL, and evaluation was carried out.

Example 49

A secondary battery was prepared by the same method as that in Example 42 except that ethyl isopropylsulfone (EiPS) was used as the sulfone compound instead of SL, and evaluation was carried out.

Results of Examples 44 to 49 are shown in Table 9.

TABLE 9

| | Non-aqueous solvent | | Capacity | Volume |
|---|---|---|---|---|
| | fluorinated ether | sulfone compound | Additive agent | retention ratio (%) | increase ratio (%) |
| Ex. 44 | $CH_3CH_2O(CF_2)_4F$ | SL | MMDS + LiFSI | 67 | 12 |
| Ex. 45 | $H(CF_2)_4CH_2O(CF_2)_2H$ | SL | MMDS + LiFSI | 65 | 13 |
| Ex. 46 | $CF_3CHFCF_2OCH_2(CF_2)_2F$ | SL | MMDS + LiFSI | 66 | 12 |
| Ex. 47 | $H(CF_2)_2CH_2OCF_2CF_2H$ | DMS | MMDS + LiFSI | 69 | 13 |
| Ex. 48 | $H(CF_2)_2CH_2OCF_2CF_2H$ | EMS | MMDS + LiFSI | 68 | 14 |
| Ex. 49 | $H(CF_2)_2CH_2OCF_2CF_2H$ | EiPS | MMDS + LiFSI | 67 | 14 |

The composition of non-aqueous solvents (volume ratio) of Examples 44 to 49 is (EC/PC/sulfone compound/fluorinated ether/FP = 1/1/1/4/3)
Ex.: Example

Example 50

A secondary battery was prepared by the same method as that in Example 42 except that 1,3-propane sultone (PS) was used instead of MMDS as the cyclic sulfonic acid ester, and evaluation was carried out.

Example 51

A secondary battery was prepared by the same method as that in Example 42 except that 1,4-butane sultone (BS) was used instead of MMDS as the cyclic sulfonic acid ester, and evaluation was carried out.

Results of Examples 50 and 51 are shown in Table 10.

TABLE 10

| | Non-aqueous solvent (volume ratio) | Additive agent | Capacity retention ratio (%) | Volume increase ratio (%) |
|---|---|---|---|---|
| Ex. 50 | EC/PC/SL/FE1/FP = 1/1/1/4/3 | PS + LiFSI | 65 | 14 |
| Ex. 51 | EC/PC/SL/FE1/FP = 1/1/1/4/3 | BS + LiFSI | 65 | 14 |

Ex.: Example

REFERENCE SIGNS LIST

1 Positive electrode active material layer
2 Negative electrode active material layer
3 Positive electrode current collector
4 Negative electrode current collector
5 Separator
6 Laminate outer package
7 Negative electrode tab
8 Positive electrode tab

The invention claimed is:
1. A lithium ion secondary battery comprising:
a positive electrode,
a separator,
an outer package comprising a laminate film, and
a non-aqueous electrolyte solution comprising a non-aqueous electrolyte solvent, wherein:
the positive electrode comprises a positive electrode active material having an operating potential of 4.5 V or higher versus lithium metal,
the separator comprises a polyolefin, and
the non-aqueous electrolyte solvent comprises:
a fluorinated phosphate ester represented by the following formula (1);

a sulfone compound selected from the group consisting of a compound represented by the following formula (2) and a compound represented by the following formula (3);
a fluorinated ether represented by the following formula (4); and
a cyclic carbonate, wherein the sulfone compound is included in an amount of 5 volume % or more in the non-aqueous electrolyte solvent, and in the non-aqueous electrolyte solvent, the volume ratio of the cyclic carbonate (CC), the sulfone compound (SF), the fluorinated phosphate ester (FP), and the fluorinated ether (FE) is in a range of CC:SF:FP:FE=5 to 15:15 to 25:10 to 30:40 to 60:

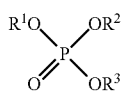

(1)

wherein $R^1$, $R^2$, $R^3$ each independently represent alkyl group or fluorinated alkyl group, and at least one thereof is fluorinated alkyl group,

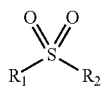

(2)

wherein $R_1$ and $R_2$ each independently represent substituted or unsubstituted alkyl group,

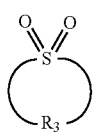

(3)

wherein $R_3$ represents substituted or unsubstituted alkylene group, $$R_{101}-O-R_{102} \quad (4)$$

wherein $R_{101}$ and $R_{102}$ of formula (4) each represent an alkyl group or a fluorinated alkyl group, and at least one of $R_{101}$ and $R_{102}$ of formula (4) is the fluorinated alkyl group.

2. The lithium ion secondary battery according to claim 1, wherein the sulfone compound comprises sulfolane.

3. The lithium ion secondary battery according to claim 1, wherein the cyclic carbonate comprises at least one of ethylene carbonate (EC) and propylene carbonate (PC).

4. The lithium ion secondary battery according to claim 3, wherein in the cyclic carbonate, the volume ratio between ethylene carbonate (EC) and propylene carbonate (PC) is in a range of EC:PC=100:0 to 50:50.

5. The lithium ion secondary battery according to claim 1, wherein the non-aqueous electrolyte solution further comprises an additive,
wherein the additive comprises at least one selected from a cyclic monosulfonic acid ester, a cyclic disulfonic acid ester, a compound including an $N(SO_2F)_2$ anion (FSI anion), and a fluorinated carbonate.

6. The lithium ion secondary battery according to claim 5, wherein the additive is included at 0.1 to 3% by mass in relation to the total mass of the non-aqueous electrolyte solution.

7. The lithium ion secondary battery according to claim 5, wherein the additive comprises one or more selected from 1,3-propane sultone, methylenemethane disulfonic acid ester, lithium bis(fluorosulfonyl)imide (LiFSI), and fluoroethylene carbonate (FEC).

8. The lithium ion secondary battery according to claim 5, wherein the additive comprises two or more compounds selected from a cyclic monosulfonic acid ester, a cyclic disulfonic acid ester, a compound including an $N(SO_2F)_2$ anion (FSI anion), and a fluorinated carbonate.

9. The lithium ion secondary battery according to claim 1, wherein the positive electrode active material is represented by the following formula (6):

$$Li_a(M_xMn_{2-x-y}A_y)(O_{4-w}Z_w) \quad (6)$$

wherein $0.4 \leq x \leq 1.2$, $0 \leq y$, $x+y<2$, $0 \leq a \leq 1.2$, $0 \leq w \leq 1$, M is at least one selected from the group consisting of Co, Ni, Fe, Cr, and Cu, A is at least one selected from the group consisting of Li, B, Na, Mg, Al, Ti, Si, K, and Ca, and Z is at least one of F and Cl.

10. The lithium ion secondary battery according to claim 1, further comprising a negative electrode,
wherein the negative electrode comprises:
a water-based binder using a water-based emulsion; and
carboxymethylcellulose (CMC) and/or a derivative thereof.

11. A method of producing a lithium ion secondary battery comprising an electrode element, an electrolyte solution, a separator and an outer package comprising a laminate film, comprising:
preparing an electrode element by placing a positive electrode and a negative electrode so as to face each other; and
encapsulating the electrode element and a non-aqueous electrolyte solution comprising a non-aqueous electrolyte solvent in the outer package,
wherein:
the positive electrode comprises a positive electrode active material which is capable of absorbing and releasing lithium, and operates at 4.5 V or higher versus lithium,
the separator comprises a polyolefin, and
the non-aqueous electrolyte solvent comprises:
a fluorinated phosphate ester represented by the formula (1);
a sulfone compound selected from the group consisting of a compound represented by the formula (2) and a compound represented by the formula (3);
a fluorinated ether represented by the following formula (4); and
a cyclic carbonate,
wherein the sulfone compound is included in an amount of 5 volume % or more in the non-aqueous electrolyte solvent, and
in the non-aqueous electrolyte solvent, the volume ratio of the cyclic carbonate (CC), the sulfone compound (SF), the fluorinated phosphate ester (FP), and the fluorinated ether (FE) is in a range of CC:SF:FP:FE=5 to 15:15 to 25:10 to 30:40 to 60:

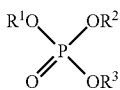

(1)

wherein $R^1$, $R^2$, $R^3$ each independently represent alkyl group or fluorinated alkyl group, and at least one thereof is fluorinated alkyl group,

(2)

wherein $R_1$ and $R_2$ each independently represent substituted or unsubstituted alkyl group,

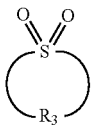

(3)

wherein $R_3$ represents substituted or unsubstituted alkylene group, $$R_{101}\text{—}O\text{—}R_{102} \qquad (4)$$

wherein $R_{101}$ and $R_{102}$ of formula (4) each represent an alkyl group or fluorinated alkyl group, and at least one of $R_{101}$ and $R_{102}$ of formula (4) is the fluorinated alkyl group.

12. A lithium ion secondary battery comprising:
a positive electrode,
a separator,
an outer package comprising a laminate film, and
a non-aqueous electrolyte solution comprising a non-aqueous electrolyte solvent, wherein:
the positive electrode comprises a positive electrode active material having an operating potential of 4.5 V or higher versus lithium metal,
the separator comprises a polyolefin and
the non-aqueous electrolyte solvent comprises:
a fluorinated phosphate ester represented by the following formula (1);
a sulfone compound selected from the group consisting of a compound represented by the following formula (2) and a compound represented by the following formula (3);
a fluorinated ether represented by the following formula (4); and
a cyclic carbonate; and
wherein the sulfone compound is included in an amount of 5 volume % or more in the non-aqueous electrolyte solvent; and
in the non-aqueous electrolyte solvent, the volume ratio of the cyclic carbonate (CC), the sulfone compound (SF), the fluorinated phosphate ester (FP), and the fluorinated ether (FE) is in a range of CC:SF:FP:FE=5 to 15: 20 to 25: 10 to 50: 20 to 60:

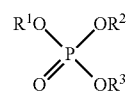

(1)

wherein $R^1$, $R^2$, $R^3$ each independently represent alkyl group or fluorinated alkyl group, and at least one thereof is fluorinated alkyl group,

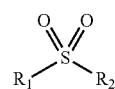

(2)

wherein $R_1$ and $R_2$ each independently represent substituted or unsubstituted alkyl group,

(3)

wherein $R_3$ represents substituted or unsubstituted alkylene group, $$R_{101}\text{—}O\text{—}R_{102} \qquad (4)$$

wherein $R_{101}$ and $R_{102}$ of formula (4) each represent an alkyl group or a fluorinated alkyl group, and at least one of $R_{101}$ and $R_{102}$ of formula (4) is the fluorinated alkyl group.

* * * * *